US012008083B2

(12) United States Patent
Gokan

(10) Patent No.: US 12,008,083 B2
(45) Date of Patent: Jun. 11, 2024

(54) INFORMATION PROCESSING APPARATUS, FOR STORING CONSENSUS INFORMATION AMONG COPYRIGHT HOLDERS IN A BLOCKCHAIN

(71) Applicant: Sony Group Corporation, Tokyo (JP)

(72) Inventor: Kenichi Gokan, Tokyo (JP)

(73) Assignee: Sony Group Corporation, Tokyo (JP)

( * ) Notice: Subject to any disclaimer, the term of this patent is extended or adjusted under 35 U.S.C. 154(b) by 167 days.

(21) Appl. No.: 17/434,873

(22) PCT Filed: Mar. 19, 2020

(86) PCT No.: PCT/JP2020/012238
§ 371 (c)(1),
(2) Date: Aug. 30, 2021

(87) PCT Pub. No.: WO2020/203340
PCT Pub. Date: Oct. 8, 2020

(65) Prior Publication Data
US 2022/0171830 A1 Jun. 2, 2022

(30) Foreign Application Priority Data
Apr. 2, 2019 (JP) .................................. 2019-070935

(51) Int. Cl.
*G06F 21/10* (2013.01)

(52) U.S. Cl.
CPC ........ *G06F 21/105* (2013.01); *G06F 21/1073* (2023.08); *G06Q 2220/18* (2013.01)

(58) Field of Classification Search
CPC ............ G06F 21/105; G06F 2221/0766; G06F 21/64; G06F 2221/0768; G06Q 2220/18; H04L 2463/121; H04L 63/123
See application file for complete search history.

(56) References Cited

U.S. PATENT DOCUMENTS

2003/0046093 A1  3/2003  Erickson et al.
2008/0071561 A1*  3/2008  Holcombe ............. G06Q 30/00
                                                     705/901
(Continued)

FOREIGN PATENT DOCUMENTS

CN    108805707 A    11/2018
JP    2002-123635 A   4/2002
(Continued)

OTHER PUBLICATIONS

International Search Report dated Jun. 23, 2020 in PCT/JP2020/012238 filed on Mar. 19, 2020, 2 pages.

*Primary Examiner* — Khalid M Almaghayreh
(74) *Attorney, Agent, or Firm* — Oblon, McClelland, Maier & Neustadt, L.L.P.

(57) ABSTRACT

An information processing apparatus, an information processing method, and an information processing program configured to manage the copyright-related information of content appropriately. The information processing apparatus includes control circuitry to acquire, when there is a plurality of copyright holders relating to one piece of content, consensus information indicating an agreement on a share of respective copyrights of the plurality of copyright holders, and create a transaction for recording the acquired consensus information on a blockchain system.

17 Claims, 23 Drawing Sheets

(56) References Cited

U.S. PATENT DOCUMENTS

| | | | | |
|---|---|---|---|---|
| 2010/0131558 | A1* | 5/2010 | Logan | G06Q 30/00 |
| | | | | 705/310 |
| 2011/0099096 | A1* | 4/2011 | Shanley | G06Q 50/184 |
| | | | | 705/310 |
| 2014/0324710 | A1* | 10/2014 | Thibout | G06Q 10/00 |
| | | | | 705/310 |
| 2017/0243216 | A1* | 8/2017 | Kohn | H04L 9/3236 |
| 2018/0039942 | A1* | 2/2018 | Rogers | G06F 16/48 |
| 2018/0241551 | A1 | 8/2018 | Fujimura et al. | |
| 2019/0373521 | A1* | 12/2019 | Crawford | H04L 67/52 |
| 2020/0074468 | A1* | 3/2020 | Arai | G06Q 20/405 |
| 2022/0058633 | A1* | 2/2022 | Yantis | G06Q 20/3676 |
| 2022/0189589 | A1* | 6/2022 | Ogawa | G16H 50/30 |

FOREIGN PATENT DOCUMENTS

| | | |
|---|---|---|
| JP | 2003-178160 A | 6/2003 |
| JP | 2003-346057 A | 12/2003 |
| JP | 2008-165625 A | 7/2008 |
| JP | 2017-50763 A | 3/2017 |
| JP | 2017-220710 A | 12/2017 |

* cited by examiner

| CONTENT ID | CATEGORY | CONTENT | DATA | RIGHTS INFORMATION ||||||
|---|---|---|---|---|---|---|---|---|---|
| | | | | RIGHT HOLDER | SHARE | PRESENCE OR ABSENCE OF MORAL RIGHTS | INTENTION TO EXERCISE |||
| | | | | | | | RIGHT TO INTEGRITY | RIGHT OF ATTRIBUTION | |
| ... | ... | ... | ... | ... | ... | ... | ... | ... | ... |
| CT1 | MUSICAL PIECE | MUSICAL PIECE MA | MDT1 | RH1 | 25% | YES (COMPOSITION) | NO | YES | ... |
| | | | | RH2 | 25% | YES (LYRICS) | NO | YES | ... |
| | | | | RH21 | 50% | NO | — | — | ... |
| CT2 | MUSICAL PIECE | MUSICAL PIECE MB | MDT2 | RH55 | 100% | YES (LYRICS, COMPOSITION) | YES | YES | ... |
| CT3 | MUSICAL PIECE | MUSICAL PIECE MC | ... | ... | ... | ... | ... | ... | ... |
| ... | ... | ... | ... | ... | ... | ... | ... | ... | ... |
| CT101 | CINEMATOGRAPHIC WORK | CINEMATOGRAPHIC WORK VA | VDT1 | ... | ... | ... | ... | ... | ... |
| ... | ... | ... | ... | ... | ... | ... | ... | ... | ... |

FIG. 11
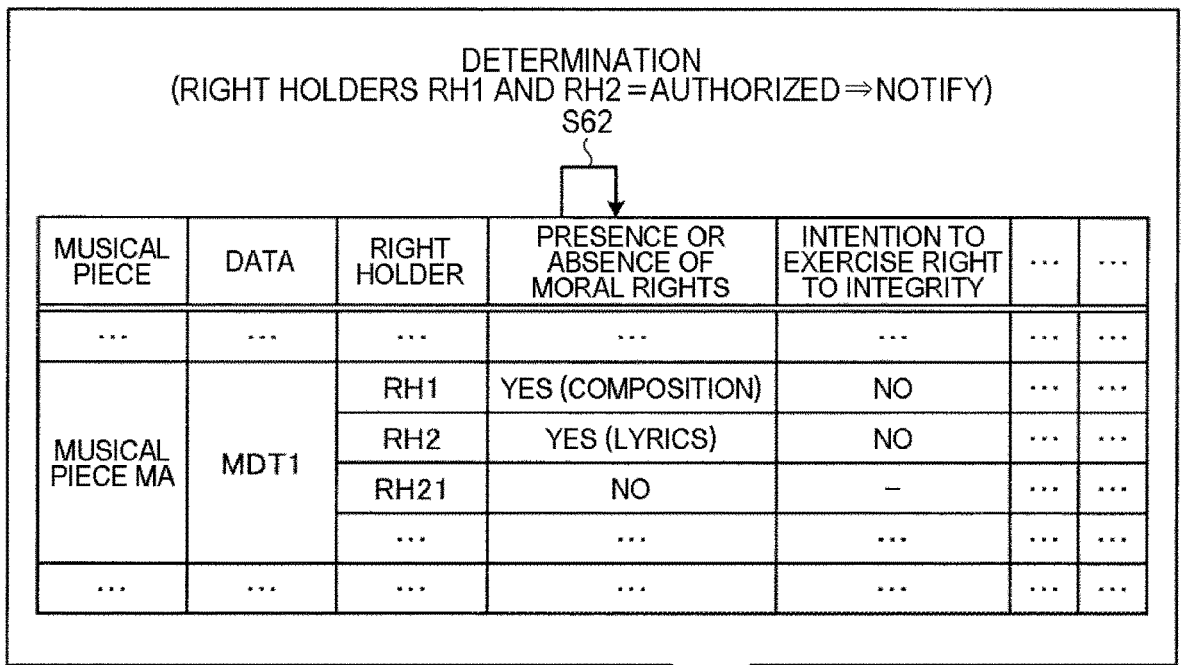
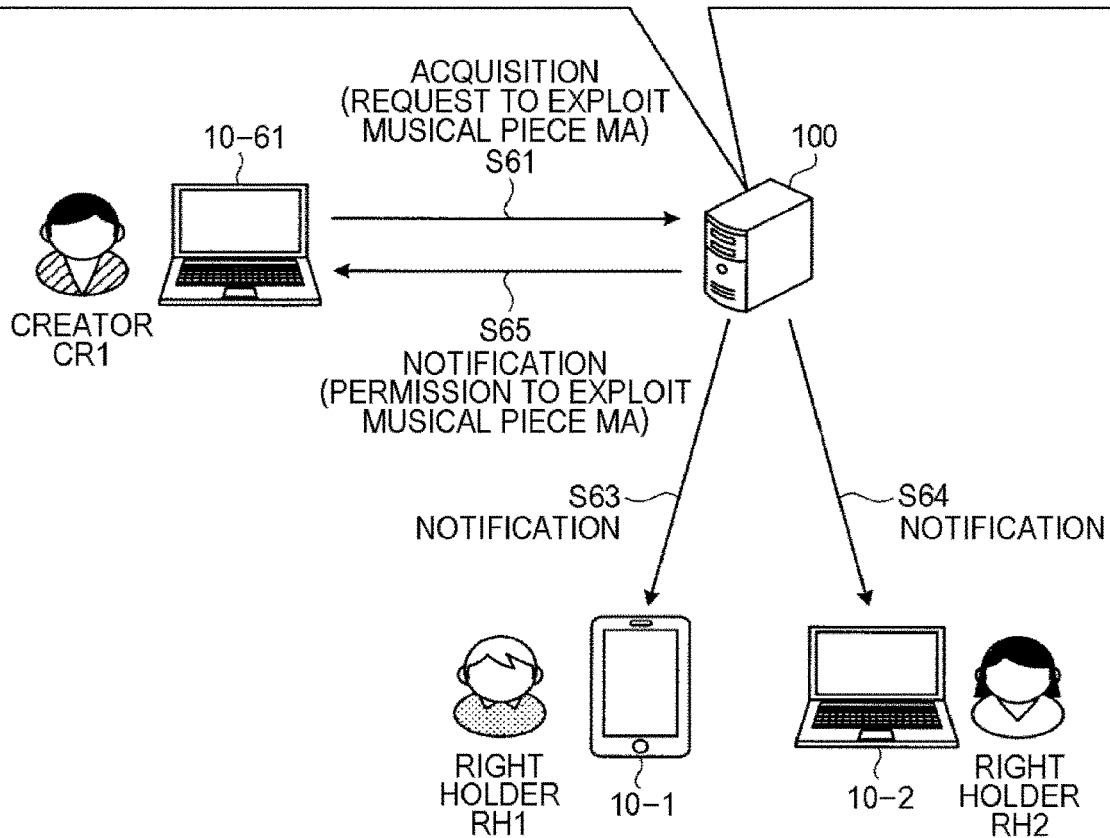

FIG. 15

| DELETE | ID ▼ | TITLE OF WORK (FILENAME) | AUTHOR NAME | STATUS | LYRICS DL | SOUND SOURCE DL | TRIAL LISTENING | REMARKS |
|---|---|---|---|---|---|---|---|---|
| 🗑 | 181002 001 | MUSICAL PIECE MA (MUSICAL_PIECE_MA.mp3) | Artist A | PENDING APPROVAL | ⬇ UNKNOWN | ⬇ 0.7MB | △ | |
| 🗑 | 180828 001 | DOCUMENT A (MUSICAL_PIECE_MA.txt) | Artist A | PENDING APPROVAL | ⬇ UNKNOWN | ⬇ 0MB | ⓘ | |
| 🗑 | 180818 006 | MUSICAL PIECE MB (MUSICAL_PIECE_MB.mp3) | Artist A | PENDING APPROVAL | ⬇ UNKNOWN | ⬇ 0.2MB | △ | |
| 🗑 | 180818 005 | MUSICAL PIECE MC (MUSICAL_PIECE_MC.mp3) | Artist A | PENDING APPROVAL | ⬇ UNKNOWN | ⬇ 5.3MB | △ | |
| 🗑 | 180818 004 | MUSICAL PIECE MD (MUSICAL_PIECE_MD.mp3) | Artist A | PENDING APPROVAL | ⬇ UNKNOWN | ⬇ 5.3MB | △ | |
| 🗑 | 180818 003 | MUSICAL PIECE ME (MUSICAL_PIECE_ME.mp3) | Artist A | PENDING APPROVAL | ⬇ UNKNOWN | ⬇ 4.3MB | △ | |
| 🗑 | 180818 002 | MUSICAL PIECE MF (MUSICAL_PIECE_MF.mp3) | Artist A | PENDING APPROVAL | ⬇ UNKNOWN | ⬇ 5.1MB | △ | |

| WORK INFORMATION | SOUND SOURCE INFORMATION | hash INFORMATION | json HISTORY |

♫ REGISTRATION APPLICATION UPLOAD EDIT
SUPPLIER SP IS LOGGED IN

— WORK INFORMATION ——

STATUS: PENDING APPROVAL

TITLE OF WORK*: MUSICAL PIECE MA

SOUND SOURCE FILE: NEW RICH TEXT DOCUMENT...  SIZE  7 byte

AUTHOR 1 NAME: Artist B — LYRICS — SHARE (%) 50

AUTHOR 2 NAME: Artist A — COMPOSITION — 50

AUTHOR 3 NAME:

AUTHOR 4 NAME:

AUTHOR 5 NAME:

AR22

REGISTRATION

♪ REGISTRATION APPLICATION UPLOAD EDIT
SUPPLIER SP IS LOGGED IN

| WORK INFORMATION | SOUND SOURCE INFORMATION | hash INFORMATION | json INFORMATION | json HISTORY (SERVER COMMUNICATION HISTORY)

(#) 180828005  (TYPE) certput_request  (CREATION DATE AND TIME) 2019-03-26 17:17:00  (CREATOR) SUPPLIER SP null (#) 180828004  (TYPE) certput_request  (CREATION DATE AND TIME) 2019-03-26 17:17:00  (CREATOR) SUPPLIER SP

```
{
  "content": {
    "timestamp": "1535444231000",
    "data":
"eyJtZXRhIjogeyJjaGFyc2V0IjogIlVURi04IiwgIndvcmstdGl0bGUiOiAiXHU2YzdrXHU3Yjk3XHUzMDZIXHUzMGNhX
HUzMGHlXHVmZjA4UmVtaXhlZCBieSBBLZW4gR29rYW5cdWZmMDkiLCAid3HpdGVycyI6IFT7lndyaXRlci1kZXNpZ2
5hdGlvbiI6ICJjcdTRmNWNcdThhNWUiLCAid3JpdGVyLW5hbWUiOiAiXHU5NTc3XHU1ZGJhlFx1NWZiOSJ9LCB71nd
yaXRlci1kZXNpZ25hdGlvbiI6ICJjcdTRmNWNcdTY2ZjIiLCAid3JpdGVyLW5hbWUiOiAiXHU1ZjhjXHU5NTTkxXHU3O
DE0XHU0ZTAwln1dfSwgInNvdW5kLWhhc2giOiBmYWxzZSwgInN1Ym1pdHRIcI6lCJzbXBqLXB0aylsICJzdWJtaXR0
ZXItd29yayl pZCl6lCJzYWtrYXVvbG9hZF8xODA4MjgwMDElfQ=="
  },
  "data_format": {
    "version": 1
  }
}
```

REGISTRATION

FIG. 22

| KEY: ID | | | | | |
|---|---|---|---|---|---|
| VALUE: { | PROOF OF RECORD: TIMESTAMP | | | | |
| | RECORDING SOURCE: | | | | |
| | DETAILS: { | RECORDER: ID | | | |
| | | CONSENSUS: AUTHENTICATION RECORD | | | |
| | | DETAILS OF ASSERTION OF RIGHTS: { | PERMISSION TO EXPLOIT: OK/NG | | |
| | | | PRIOR CONFIRMATION (SUCH AS SOUND SOURCE OR DOCUMENT): NO/YES | | |
| | | | PRE-SETTING (SUCH AS DISTRIBUTION RATIO): { | | |
| | | ... | | | |

| IDENTIFICATION INFORMATION (CONTENT ID): CT1 (MUSICAL PIECE MA) | | |
|---|---|---|
| | RECORDER: PUBLISHER PB | |
| | CONSENSUS: HASH VALUE HDT1 (CONSENSUS INFORMATION CDT1) | SHARE INFORMATION: {RIGHT HOLDER RH1 = 25, RIGHT HOLDER RH2 = 25, PUBLISHER PB = 50} |

| NOTICE OF WORK | | | | | | |
|---|---|---|---|---|---|---|
| IDENTIFICATION INFORMATION | WORK CODE | | | | | |
| | ISWC (INTERNATIONAL STANDARD MUSICAL WORK CODE) | | | | | |
| FILING DATE | YEAR | MONTH | DAY | | | |
| TITLE OF WORK | | | | | | |
| | SUBTITLE | | | | | |
| AUTHOR | LYRICS | | | | | |
| | COMPOSITION | | | | | |
| MUSIC PUBLISHER | REPRESENTATIVE | | | | | |
| | RIGHT HOLDER CODE | | | | | |
| | JOINT | | | | | |
| | | CONTRACTOR | | | | |
| | | CONTRACT DATE | | | | |
| | | CONTRACT PERIOD | | | | |
| | | AUTOMATIC RENEWAL | | | | |
| | | TRANSFER AREA | | | | |
| | | DISTRIBUTION RATIO | PERFORMANCE RIGHTS | | | |
| | | | SOUND RECORDING RIGHTS · RIGHT OF RENTAL | | | |
| | | | PUBLICATION RIGHTS | | | |
| | | | SYNCHRONIZATION RIGHTS | | | |
| MAKING PUBLIC | PERFORMANCE TIME | | | | | |
| | PUBLICATION DATE | | | | | |
| NOTIFIER | | | | | | |

INFORMATION PROCESSING APPARATUS, FOR STORING CONSENSUS INFORMATION AMONG COPYRIGHT HOLDERS IN A BLOCKCHAIN

TECHNICAL FIELD

The present disclosure relates to an information processing apparatus, an information processing method, and an information processing program.

BACKGROUND ART

Technologies that facilitate the management of the rights of various copyrighted works (content) have been provided. In one example, the management of the exploitation of content or the distribution of interests obtained by sales or the like of content to the right holder of the content is performed on the basis of the information regarding the rights of the content to be managed.

CITATION LIST

Patent Document

Patent Document 1: Japanese Patent Application Laid-Open No. 2002-123635

SUMMARY OF THE INVENTION

Problems to be Solved by the Invention

In the related art, copyright royalties are distributed to the right holders of a copyrighted work in the distribution of copyrighted works on a network.

However, the related art is not necessarily capable of managing the copyright-related information of content appropriately. In one example, the related art only distributes the royalties to the registered right holders. Such technology fails to perform the management of the copyright-related information or the distribution of royalties appropriately as long as the author's intention or the like to create the copyrighted work is not managed properly. Accordingly, appropriate management of the copyright-related information of content is desired.

Thus, the present disclosure provides an information processing apparatus, an information processing method, and an information processing program, capable of managing the copyright-related information of content appropriately.

Solutions to Problems

In order to solve the above issues, an information processing apparatus according to an embodiment of the present disclosure includes an acquisition unit configured to acquire, in a case where there is a plurality of copyright holders relating to one piece of content, consensus information indicating an agreement on a share of respective copyrights of the plurality of copyright holders, and a generation unit configured to create a transaction for recording the consensus information acquired by the acquisition unit on a blockchain.

BRIEF DESCRIPTION OF DRAWINGS

FIG. 5 is a diagram illustrating an example of a content information storage unit according to an embodiment of the present disclosure.

FIG. 11 is a diagram illustrating an example of an overview of notification regarding the author's moral rights.

FIG. 15 is a diagram illustrating an example of an indication of information.

FIG. 16 is a diagram illustrating an example of an indication of information.

FIG. 17 is a diagram illustrating an example of an indication of information.

FIG. 22 is a diagram illustrating an example of a data configuration including copyright additive information.

FIG. 23 is a diagram illustrating an example of a transaction.

FIG. 24 is a diagram illustrating an example of notice information regarding a musical piece.

MODE FOR CARRYING OUT THE INVENTION

Figure 1:
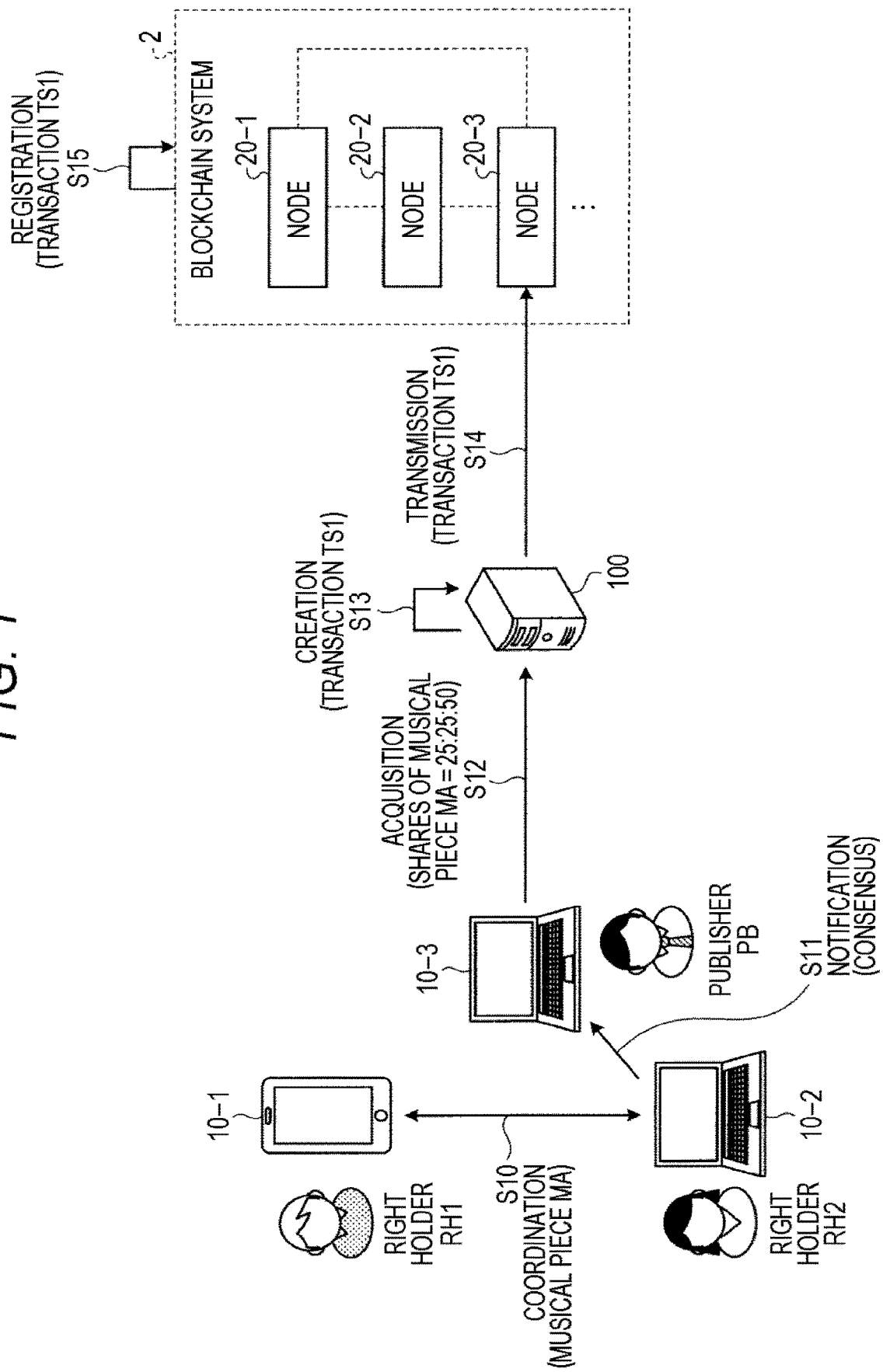
FIG. 1 is a diagram illustrating an example of information processing according to an embodiment of the present disclosure.

Embodiments of the present disclosure are now described in detail on the basis of the drawings. Moreover, these preferred embodiments do not limit the information processing apparatus, information processing method, and information processing program according to the present disclosure. Moreover, in embodiments described below, the same components are denoted by the same reference numerals, and so a description thereof is omitted as appropriate.

The present disclosure is described in the order of items below.

1. Embodiment
    1-1. Overview of Information Processing according to Embodiment of Present Disclosure
    1-2. Configuration of Information Processing System according to Embodiment
    1-3. Configuration of Information Processing Apparatus according to Embodiment
    1-4. Configuration of Terminal Device according to Embodiment
    1-5. Information Processing Procedure according to Embodiment
    1-6. Share Information
    1-7. Author's Moral Rights Information
    1-8. Indication of Information
        1-8-1. Display Example by DAW of Terminal Device
        1-8-2. Display Example on Right Registration Screen of Terminal Device
    1-9. Configuration and Processing Example of System
    1-10. Data Structure
2. Other Exemplary Configurations
3. Hardware Configuration 1. Embodiment

[1-1. Overview of Information Processing According to Embodiment of Present Disclosure]

FIG. 1 is a diagram illustrating an example of information processing according to an embodiment of the present disclosure. The information processing according to an embodiment of the present disclosure is embodied as an information processing apparatus 100.

The example of FIG. 1 illustrates a case where copyright additive information used additionally regarding the copyright of a musical piece MA, which is an example of the content, is stored in the blockchain of a blockchain system 2. Moreover, the musical piece referred to herein is a concept including a musical work (music), and it corresponds to a piece of music if there are no lyrics, and it corresponds to the lyrics and piece of music if there are lyrics. The musical piece MA illustrated in FIG. 1 is assumed to be content composed by a right holder RH1 and written by a right holder RH2. In addition, the content is not limited to a musical piece and can be various types of content including video content such as movies or literary content such as novels. In addition, the content is not limited to the completed content such as musical pieces but can be a part of the sound source used for a musical piece or a short sound used for sampling. The example of FIG. 1 illustrates a case where the copyright additive information includes information indicating the share of the respective right holders of the copyright and consensus information (agreement information) indicating the agreement of the right holders on their respective shares. Moreover, the copyright additive information is not limited to information indicating the right's share and can be various types of additional information regarding the copyright, such as information regarding the author's moral rights.

A terminal device 10-1, a terminal device 10-2, a terminal device 10-3, and the like are illustrated to identify each terminal device 10, but the term "terminal device 10" is herein used unless a particular distinction between them is made. In the example of FIG. 1, the right holder RH1 and the right holder RH2 coordinate their shares of the copyright on the musical piece MA (step S10). The coordination is made so that the right holder RH1 and the right holder RH2 reach an agreement (consensus) on their shares of the copyright of the musical piece MA. The right holder RH1 and the right holder RH2 operate their respective terminal devices 10-1 and 10-2 to coordinate their shares using a tool such as chatting or a bulletin board. The right holder RH1 and the right holder RH2 use their respective terminal devices 10-1 and 10-2 to coordinate their shares by exchanging information such as "It's okay with share halved" or "It's also okay with share divided by 25%". In one example, the right holder RH1 and the right holder RH2 operate their respective terminal devices 10-1 and 10-2 to coordinate their shares using a chatting function (see FIG. 14) of an application X described later. In one example, the right holder RH1 and the right holder RH2 agree that their respective shares can be obtained by dividing the author's shares into two equal parts. In the example of FIG. 1, the right holder RH1 and the right holder RH2 agree to divide in half the proportions excluding a predetermined percentage of share of a music publisher (hereinafter also referred to as "publisher") engaged in business such as copyright management and promotion of the musical piece MA. The right holder RH1 and the right holder RH2 agree to divide in half the proportions excluding the share (such as 50%) of the publisher PB. Then, the terminal device 10-2 used by the right holder RH2 notifies the terminal device 10-3 used by a predetermined administrator of the publisher PB of the musical piece MA (hereinafter simply referred to as "publisher PB") of the information regarding the determined agreement on the shares (also referred to as "consensus information") (step S11). The terminal device 10-2 transmits the information indicating that the right holder RH1 and the right holder RH2 reach an agreement (consensus) to share half (50%) of each, excluding the proportion (50%) of the publisher PB to the terminal device 10-3. In one example, the terminal device 10-2 transmits the information indicating that the right holder RH1 and the right holder RH2 reach an agreement (consensus) to share 25% of each. In one example, the terminal device 10-2 transmits to the terminal device 10-3 an electronic mail (email) or a chatting history indicating that a plurality of right holders RH1 and RH2 reaches a copyright's share agreement. In one example, the terminal device 10-2 transmits, to the terminal device 10-3, text log information indicating that the plurality of right holders RH1 and RH2 reaches an agreement to their respective copyright shares. Moreover, FIG. 1 illustrates, as an example, the case where the terminal device 10-2 used by the right holder RH2 notifies the terminal device 10-3, but the terminal device 10-1 used by the right holder RH1 can notify the terminal device 10-3.

Further, the processing of coordinating the agreement on the shares illustrated in FIG. 1 is an example. The publisher PB can perform the coordination regarding the copyright shares between the right holder RH1 and the right holder RH2. In this case, the terminal device 10-3 of the publisher PB communicates via an email or using a message with the terminal device 10-1 used by the right holder RH1 in response to the publisher PB's operation. On the other hand, the terminal device 10-1 performs communication such as a reply to an email or a message regarding the rights shares on the musical piece MA from the publisher PB in response to the right holder RH1's operation. This allows the publisher PB to coordinate the shares on the musical piece MA of the right holder RH1. In one example, the terminal device 10-3 transmits an email such as "Is it okay if the shares of the right holders RH1 and RH2 are 25% each and the share of the publisher PB is 50% for the musical piece MA?", to the terminal device 10-1, in response to the publisher PB's operation. On the other hand, the terminal device 10-1 transmits an email such as "Yes, it's okay with 25% as my share" to the terminal device 10-3 in response to the operation of the right holder RH1.

In addition, the terminal device 10-3 used by the publisher PB communicates via an email or using a message with the terminal device 10-2 used by the right holder RH2 in response to the publisher PB's operation. On the other hand, the terminal device 10-2 performs communication such as a reply to an email or a message regarding the rights shares on the musical piece MA from the publisher PB in response to the right holder RH2's operation. This allows the publisher PB to coordinate the shares on the musical piece MA of the right holder RH2. In one example, the terminal device 10-3 transmits an email such as "Is it okay if the shares of the right holders RH1 and RH2 are 25% each and the share of the publisher PB is 50% for the musical piece MA?", to the terminal device 10-2, in response to the publisher PB's operation. On the other hand, the terminal device 10-2 transmits an email such as "Yes, it's okay with 25% as my share" to the terminal device 10-3 in response to the operation of the right holder RH2. Moreover, the example described above shows the case where an agreement on the shares is reached in a one-time exchange with the respective right holders for simplicity of description, but the agreement can be exchanged multiple times or can be exchanged collectively with all right holders. In addition, as described above, the right holder RH1 and the right holder RH2 can operate their respective terminal devices 10-1 and 10-2 to determine the agreement on the share using a tool such as chatting or a bulletin board and then to notify the terminal device 10-3 of the publisher B of the agreement on the shares. In this way, the terminal device 10-3 used by the publisher PB can acquire the information regarding the agreement on the right holders' shares by any processing as long as the information regarding the agreement on the right holders' shares is available.

The coordination described above allows the terminal device 10-3 to generate copyright additive information indicating that the shares of the right holders RH1 and RH2 are 25% each and the share of the publisher PB is 50% for the musical piece MA (referred to as "copyright additive information RDT1"). In addition, the terminal device 10-3 generates consensus information indicating that the right holder RH1, the right holder RH2, and the publisher PB reach an agreement on the share of the musical piece MA (referred to as "consensus information CDT1"). In one example, the terminal device 10-3 uses a history (text information) of an email, chatting, bulletin board, or the like described above as the consensus information CDT1.

The terminal device 10-3 transmits the copyright additive information indicating that the right holder RH1, the right holder RH2, and the publisher PB have their respective shares on the musical piece MA at a proportion of "25:25:50" (the copyright additive information RDT1) to the information processing apparatus 100. The information processing apparatus 100 acquires the copyright additive information indicating that the right holder RH1, the right holder RH2, and the publisher PB have their respective shares on the musical piece MA at a proportion of "25:25:50" (the copyright additive information RDT1) (step S12). In the example of FIG. 1, the terminal device 10-3 transmits the copyright additive information RDT1 including the consensus information CDT1 and the right holder RH1 to the information processing apparatus 100. This allows the information processing apparatus 100 to acquire the copyright additive information RDT1 including the consensus information CDT1, the right holder RH1, and the right holder RH1. The example of FIG. 1 illustrates the case where the consensus information CDT1 is used as the copyright additive information RDT1.

The information processing apparatus 100 creates a transaction TS1 used to store the copyright additive information in the blockchain of the blockchain system 2 (step S13). The information processing apparatus 100 creates the transaction TS1 using the consensus information CDT1. The information processing apparatus 100 creates the transaction TS1 including the information indicating that the right holder RH1, the right holder RH2, and the publisher PB have their respective shares on the musical piece MA at a proportion of "25:25:50". In one example, the information processing apparatus 100 creates the transaction TS1 including the consensus information CDT1 and information used to identify musical piece MA (such as a content ID).

The information processing apparatus 100 hashes the consensus information CDT1 using a predetermined hash function. In one example, the information processing apparatus 100 hashes the consensus information CDT1 using a predetermined hash function stored in a function information storage unit 124 (see FIG. 7). In one example, the information processing apparatus 100 hashes the consensus information CDT1 including the information regarding the agreement on the shares as shown in a data group DT121 in a data group DT12 illustrated in FIG. 21. This hashing allows the information processing apparatus 100 to generate a hash value HDT1 obtained by hashing the consensus information CDT1. Then, the information processing apparatus 100 creates the transaction TS1 including the hash value HDT1 and the information used to identify the musical piece MA (such as content ID). In one example, the information processing apparatus 100 creates the transaction TS1 corresponding to a transaction format stored in the blockchain of the blockchain system 2. In the example of FIG. 1, the information processing apparatus 100 creates the transaction TS1, as illustrated in FIG. 23. FIG. 23 is a diagram illustrating an example of a transaction. The information processing apparatus 100 creates the transaction TS1 including identification information (content ID) used to identify that a target of the consensus is the musical piece MA and information indicating that a recorder of the consensus of the musical piece MA is the publisher PB. The information processing apparatus 100 creates the transaction TS1 including a content ID "CT1" of the musical piece MA or an ID that identifies the publisher PB. In addition, the information processing apparatus 100 creates the transaction TS1 including information indicating that the right holder RH1, the right holder RH2, and the publisher PB agree on their respective shares for the musical piece MA at a proportion of "25:25:50". Specifically, the information processing apparatus 100 creates the transaction TS1 including the hash value HDT1 obtained by hashing the consensus information CDT1 indicating the agreement on the shares between the right holder RH1, the right holder RH2, and the publisher PB. The information processing apparatus 100 creates the transaction TS1 including the hash value HDT1 obtained by hashing the consensus information CDT1 that is text log information indicating an agreement on the shares of copyright between the right holder RH1, the right holder RH2, and the publisher PB. In addition, the information processing apparatus 100 creates the transaction TS1 including share information indicating that the right holder RH1, the right holder RH2, and the publisher PB have their respective shares on the musical piece MA of 25%, 25%, and 50%. Moreover, FIG. 23 is an example, and the information processing apparatus 100 can create transactions having various data structures depending on the information registered with the blockchain system 2.

The information processing apparatus 100 transmits the created transaction TS1 to the blockchain system 2 for registering it in the blockchain system 2 (step S14). In the example of FIG. 1, the information processing apparatus 100 transmits the transaction TS1 to a node 20-3 of the blockchain system 2.

The blockchain system 2, when receiving the transaction TS1, registers the received transaction TS1 with the blockchain (step S15). The blockchain system 2 generates a block including the transaction TS1 and registers (adds) the generated block to the blockchain. The blockchain system 2 generates and manages a blockchain of blocks including the transaction TS1 by appropriately using various techniques in the related art regarding blockchain. In one example, the blockchain system 2 is formed by appropriately using various techniques in the related art described later, but the details will be described later.

As described above, the blockchain system 2 generates a block including the transaction TS1 and registers (adds) the generated block with the blockchain. In one example, in a case where there is predetermined consensus (consensus building) for the block (a block X) including the transaction TS1, a timestamp indicating the time, and a hash value of the previous block, the blockchain system 2 registers (adds) the block X with the blockchain. This allows the transaction TS1 including information indicating that the right holder RH1, the right holder RH2, and the publisher PB have their respective shares on the musical piece MA at a proportion of "25:25:50" to be stored in the blockchain of the blockchain system 2.

As described above, the information processing apparatus 100 stores the transaction including the information indicating the share of each right holder on the musical piece in the blockchain of the blockchain system 2, so it is possible to manage the information relating to the content copyright appropriately. Moreover, the example of FIG. 1 shows the case where an information processing system 1 stores and manages the right holder's copyright share in the blockchain of the blockchain system 2 as the copyright additive information. However, the copyright additive information can be any information as long as it is additional information relating to copyright, such as the author's moral rights. In one example, the information processing apparatus 100 can acquire the copyright additive information regarding the author's moral rights, such as the right to integrity or the right of attribution, from the right holder RH1. In one example, the information processing apparatus 100 acquires, from the terminal device 10 used by the right holder RH1, copyright additive information (copyright additive information RDT11) indicating that the right holder RH1 does not intend to exercise the right to integrity. Then, the information processing apparatus 100 creates a transaction (a transaction TS11) including the copyright additive information RDT11. In one example, the information processing apparatus 100 creates the transaction TS11 including information used to identify the right holder RH1 or information indicating that the right holder RH1 has no intention to exercise the right to integrity. The information processing apparatus 100 transmits the created transaction TS11 to the blockchain system 2 for registering it in the blockchain system 2. For example, the information processing apparatus 100 transmits the transaction TS11 to a node 20-1 of the blockchain system 2. The blockchain system 2, when receiving the transaction TS1, registers the received transaction TS11 with the blockchain.

In addition, for example, the information processing apparatus 100 acquires, from the terminal device 10 used by the right holder RH1, copyright additive information (copyright additive information RDT12) indicating that the right holder RH1 intends to exercise the right of attribution. Then, the information processing apparatus 100 creates a transaction (a transaction TS12) including the copyright additive information RDT12. In one example, the information processing apparatus 100 creates the transaction TS12 including information used to identify the right holder RH1 or information indicating that the right holder RH1 has intention to exercise the right of attribution. The information processing apparatus 100 transmits the created transaction TS12 to the blockchain system 2 for registering it in the blockchain system 2. For example, the information processing apparatus 100 transmits the transaction TS12 to a node 20-1 of the blockchain system 2. The blockchain system 2, when receiving the transaction TS1, registers the received transaction TS12 with the blockchain. In addition, the processing in the node that registers the transaction TS12 with the blockchain system 2 can be performed in the information processing apparatus 100. In the case where the information processing apparatus 100 executes the processing in the node, it further includes a blockchain data storage unit that records blockchain data. Specifically, in a case where a consensus agreement is reached between a plurality of nodes on the basis of a predetermined consensus algorithm, block data including a plurality of transactions is shared by each node via a P2P network in accordance with the consensus agreement and is stored in the blockchain data storage unit of each of the plurality of nodes.

As described above, the information processing apparatus 100 can have the function of the node 20 of the blockchain system 2. The information processing apparatus 100 and the node 20 can be configured integrally. In one example, the information processing apparatus 100 can be the node 20 of the blockchain system 2. In this case, a processing unit 133 of the information processing apparatus 100 executes blockchain consensus agreement processing for recording the transaction in the blockchain. In one example, the processing unit 133 of the information processing apparatus 100 can execute the agreement processing by appropriately using various consensus building algorithms described later. In addition, the processing unit 133 of the information processing apparatus 100 stores data including transactions in the blockchain data storage unit (not illustrated) of a storage unit 120 as blockchain data in the case where the consensus agreement processing of the blockchain is executed. In addition, the information processing apparatus 100 transmits blockchain data including transactions to another node 20. The other node 20, when receiving the blockchain data from the information processing apparatus 100, stores the received blockchain data in the blockchain data storage unit.

In one example, in the related art, the easy checking of the owner of rights or type of rights is failed in registering content right information with the rights management association. On the other hand, the information processing apparatus 100 is capable of facilitating the checking or distribution of the content right information by recording the right distribution conditions and the proof of the consent to the distribution conditions in the blockchain and by making them referenceable. In one example, a management association terminal 50 requests the blockchain system 2 to provide information regarding the content such as a musical piece to be checked and checks the rights or the like regarding the content on the basis of the information received from the blockchain system 2 to check the content. Thus, the management association terminal 50 is capable of facilitating the checking or distribution of the content right information. The information processing system 1 records the right distribution conditions of content and the agreement on the right distribution in the blockchain of the blockchain system 2. In this way, the information processing system 1 records the evidence of the consent to the rights distribution conditions in the blockchain. Thus, it is possible for the rights management association to execute the distribution relating to the rights on the basis of the consent information of the blockchain. In one example, the information processing system 1 stores the consensus information and copyright additive information in the blockchain system 2 in association with a timestamp, so it is possible to appropriately estimate the time point when an agreement on rights such as share is reached.

[1-2. Configuration of Information Processing System According to Embodiment]

Figure 2:
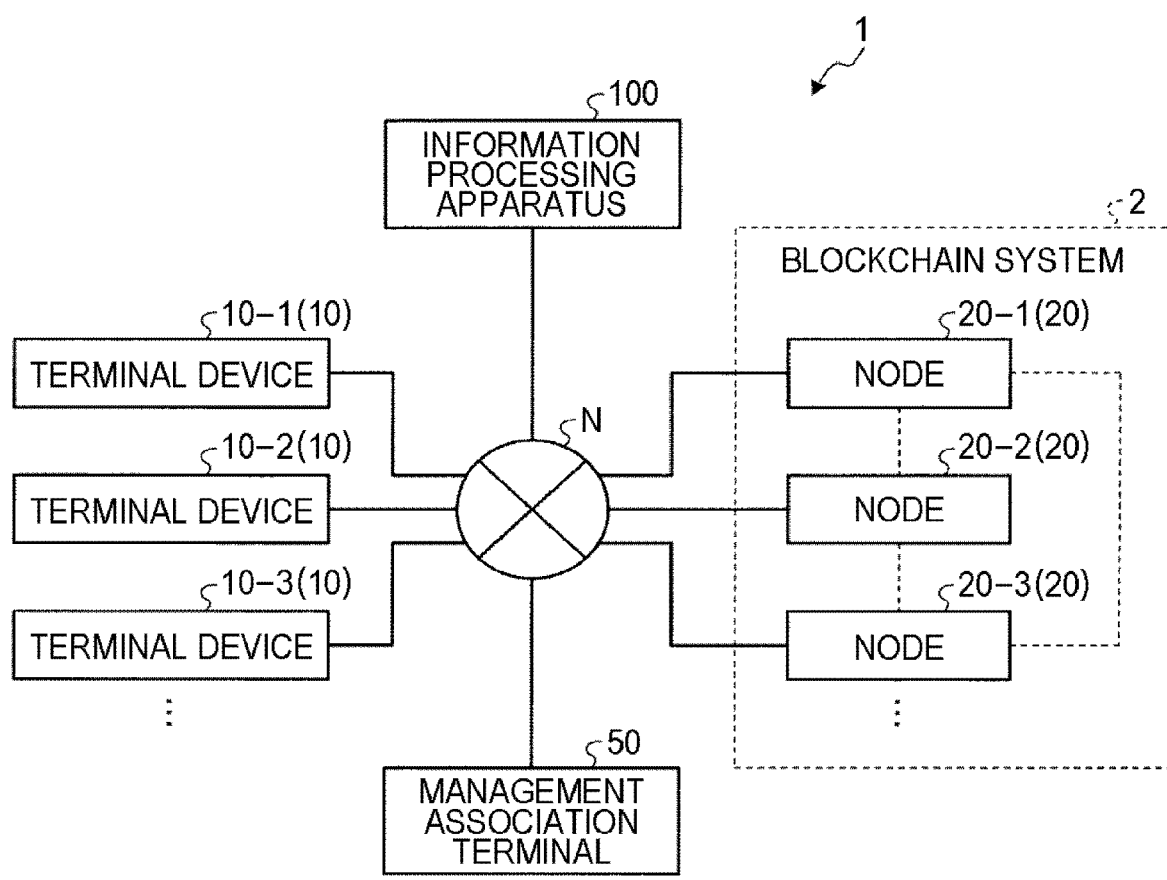
FIG. 2 is a diagram illustrating an exemplary configuration of an information processing system according to an embodiment of the present disclosure.

The information processing system 1 illustrated in FIG. 2 is described. FIG. 2 is a diagram illustrating an exemplary configuration of an information processing system according to an embodiment of the present disclosure. As illustrated in FIG. 2, the information processing system 1 includes the information processing apparatus 100, the terminal device 10, the management association terminal 50, and the blockchain system 2. The terminal device 10, the information processing apparatus 100, the terminal device 10, the management association terminal 50, and the blockchain system 2 are connected via a predetermined communication network (a network N) to be communicable by wired or wirelessly.

The information processing system 1 illustrated in FIG. 2 can include a plurality of information processing apparatuses 100, a plurality of terminal devices 10, or a plurality of management association terminals 50. In one example, the blockchain system 2 can have any configuration as long as it can manage the blockchain of blocks including transactions generated by the information processing apparatus 100. In one example, the blockchain system 2 is configured by using the technology relating to Hyperledger Fabric. In one example, regarding the Hyperledger Fabric, the disclosure is given as follows:

Hyperledger Fabric <https://www.hyperledger.org/projects/fabric>

The blockchain system 2 generates and manages a blockchain of blocks including transactions by appropriately using various conventional techniques relating to the blockchain such as the Hyperledger Fabric described above. In one example, the form of the blockchain system 2 can be consortium blockchain. In one example, the blockchain system 2 can appropriately use various conventional techniques such as practical Byzantine Fault Tolerance (PBFT) as the consensus building algorithm (consensus algorithm).

Moreover, the form of the blockchain in the blockchain system 2 is not limited to the consortium blockchain (a consortium chain) and can be various forms of blockchain such as public chain and private chain. In addition, as the consensus building algorithm (consensus algorithm) of the blockchain system 2, various conventional techniques such as proof-of-consensus (PoC), proof-of-stake (PoS), and Proof-of-importance (PoI) can be used appropriately. In other words, in the information processing system 1, the blockchain system 2 can be in any form as long as the copyright additive information of the musical piece is capable of being managed by using blockchain-related techniques.

In the example illustrated in FIG. 2, the blockchain system 2 includes a plurality of nodes 20-1, 20-2, 20-3, and so on. Moreover, FIG. 2 illustrates only nodes 20-1, 20-2, and 20-3, but the arrangement is not limited to nodes 20-1, 20-2, and 20-3, but includes four or more nodes 20 such as node 20-4 or 20-5. In addition, the nodes 20-1, 20-2, 20-3, and so on are described as a node 20 unless a particular distinction between them is made.

The blockchain system 2 is a system that performs processing relating to blockchain. The blockchain system 2 is a system that manages a blockchain in which each block including a transaction relating to copyright additive information is associated with each other in the order in which the blocks are generated. The node 20 of the blockchain system 2 is an information processing apparatus that executes various processes such as block generation or blockchain sharing. The node 20 includes, for example, a communication unit configured by a network interface card (NIC), a communication circuit, or the like and is connected to the network N (such as the Internet) by wired or wirelessly. The node 20 transmits and receives information to and from other devices, such as the terminal device 10, via the network N. Each node 20 communicates with the other node 20 to exchange blockchain-related information. The node 20 communicates with the information processing apparatus 100, the terminal device 10, and the management association terminal 50.

The node 20 has, for example, a control unit configured by a central processing unit (CPU), a micro processing unit (MPU), or the like and executes various information processes. The node 20 has, for example, a storage unit configured by a semiconductor memory device such as random access memory (RAM) and flash memory or by a storage device such as a hard disk or optical disc drive. Each node 20 stores the blockchain in the storage unit.

Further, the node 20 responds to a request from an external device, extracts information corresponding to the request, and transmits the information to the request source. In one example, when receiving the specifying information used to specify the information from an external device, the node 20 extracts the corresponding information from the blockchain stored in the storage unit and transmits the extracted information to the request source. Moreover, the blockchain system 2 can include a service-providing device that performs various processes such as acquiring the corresponding information from the node 20 in response to a request from an external device and transmitting it to the request source. In one example, the blockchain system 2, when receiving the hash value of the copyright additive information, the hash value of the sound, or the identification information (content ID) of the musical piece, transmits the information regarding the musical piece corresponding to the hash value or the identification information to the request source. In one example, the node 20 of the blockchain system 2, when receiving the hash value of the copyright additive information, the hash value of the sound, or the identification information (content ID) of the musical piece, transmits the information regarding the musical piece corresponding to the hash value or the identification information to the request source. The node 20 searches (extracts) the information corresponding to the request from the request source by appropriately using various techniques relating to the search of the blockchain and transmits the searched (extracted) information to the request source. The node 20 searches for information corresponding to the request from the request source by appropriately using various techniques such as a block (blockchain) explorer, and transmits the information resulting from the search result to the request source.

The information processing apparatus 100 provides a service relating to the management of additional copyright additive information. The information processing apparatus 100 is an information processing apparatus that creates a transaction for storing the copyright additive information regarding the content copyright in the blockchain. The information processing apparatus 100 creates a transaction for storing the copyright additive information including the consensus information acquired from the terminal device 10 in the blockchain. The information processing apparatus 100 transmits the generated transaction to the node 20 of the blockchain system 2.

The terminal device 10 is an information processing apparatus used by a right holder or the like of the content. In one example, the terminal device 10 is used by a user such as the author of the content. In one example, the terminal device 10 is used by a publisher engaged in business such as management, development, and promotion for the copyright of a musical work (musical piece). The terminal device 10 transmits the consensus information, the copyright additive information, or the like to the information processing apparatus 100. The terminal device 10 can be any device as long as the processing in an embodiment can be implemented. In one example, the terminal device 10 can be a device such as a smartphone, a tablet terminal, a notebook personal computer (PC), a desktop PC, a mobile phone, or a personal digital assistant (PDA). The example of FIG. 1 illustrates the case where the terminal device 10 is a smartphone or a notebook PC.

The management association terminal 50 is an information processing apparatus used by a business operator (hereinafter also referred to as a "management association") that manages the content rights. In one example, the management association terminal 50 is an information processing apparatus used by a business operator that manages copyrights relating to a musical piece (music). In one example, the management association can be a business operator that manages the copyright of a musical piece by receiving a trust of copyrights such as sound recording rights or and musical performance rights from the right holder such as lyricist, composer, or publisher who holds the copyright of the musical piece. In one example, the management association performs exploitation permission (license) for a person who exploits a musical piece, collection of royalties, distribution of royalties to the right holders, and monitoring of copyright infringement.

The management association terminal 50 includes, for example, a communication unit embodied by an NIC, a communication circuit, or the like and is connected to a network N (such as the Internet) by wired or wirelessly. The management association terminal 50 transmits or receives information to or from other devices such as the information processing apparatus 100, the terminal device 10, and the node 20 of the blockchain system 2 via the network N. The management association terminal 50 receives notice information regarding the copyright of the content from the terminal device 10. The management association terminal 50 receives notice information regarding a trust for the copyright of the content from the terminal device 10.

Further, the management association terminal 50 can request the blockchain system 2 to provide information and perform judgment for the content copyright on the basis of the information acquired from the blockchain system 2. The management association terminal 50 can request information regarding the copyright additive information from the node 20, and perform judgment for the content copyright on the basis of the information acquired from the node 20. In one example, the management association terminal 50 can request information regarding the share of the copyright of the content from the node 20, and can make a judgment regarding the share of the content copyright on the basis of the information acquired from the node 20. The management association terminal 50 has, for example, a control unit embodied by a CPU, an MPU, or the like and executes various information processes.

[1-3. Configuration of Information Processing Apparatus According to Embodiment]

Figure 3:
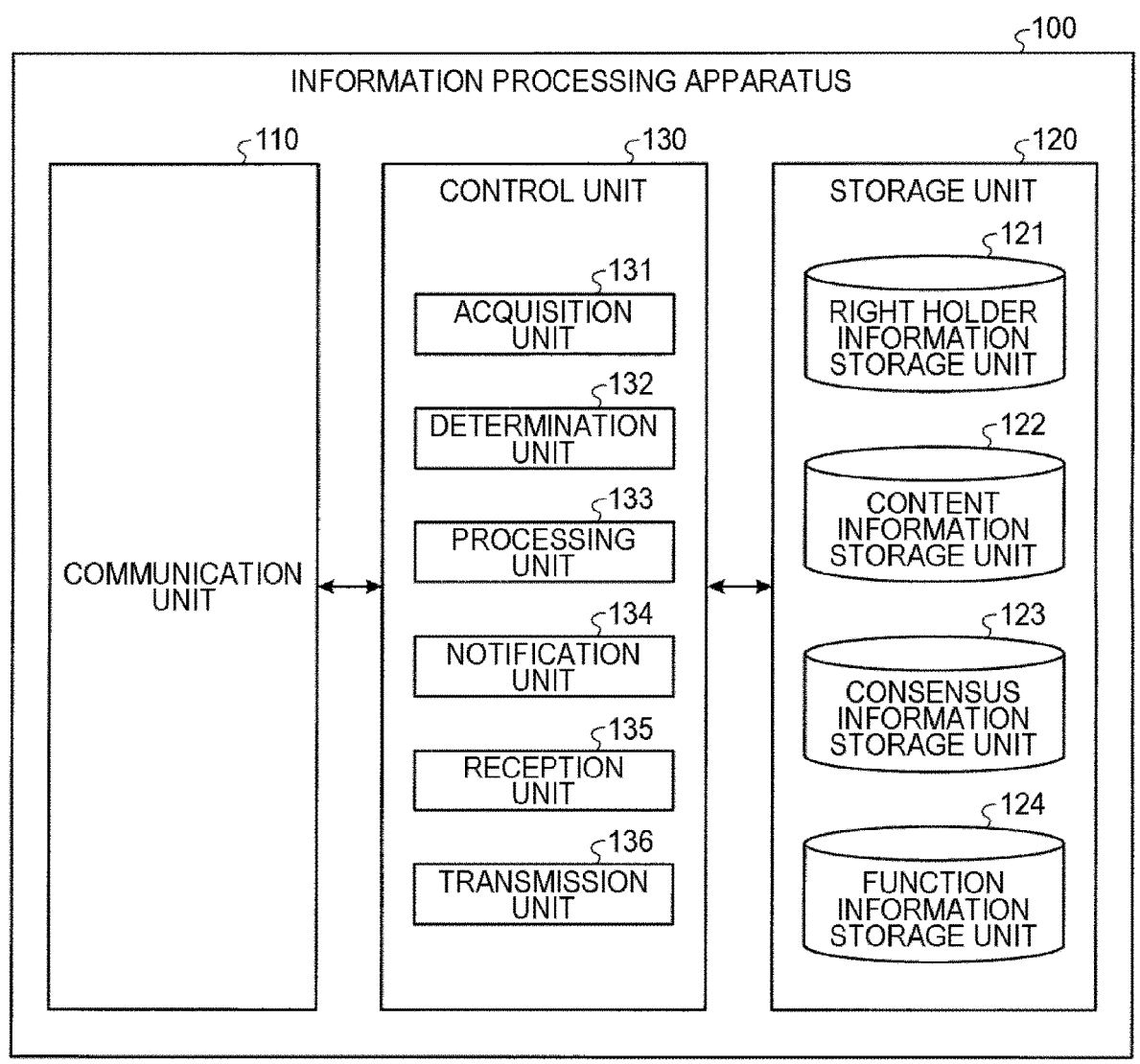
FIG. 3 is a diagram illustrating an exemplary configuration of an information processing apparatus according to an embodiment of the present disclosure.

The description is now given of the configuration of the information processing apparatus 100, which is an example of the information processing apparatus that executes the information processing according to an embodiment. FIG. 3 is a diagram illustrating an exemplary configuration of an information processing apparatus 100 according to an embodiment of the present disclosure.

As illustrated in FIG. 3, the information processing apparatus 100 includes a communication unit 110, the storage unit 120, and a control unit 130. Moreover, the information processing apparatus 100 can include an input unit (e.g., such as a keyboard or mouse) that receives, as an input, various operations from an administrator or the like of the information processing apparatus 100 and a display unit (e.g., such as a liquid-crystal display) that displays various types of information.

The communication unit 110 is embodied by, for example, a network interface card (NIC) or the like. Then, the communication unit 110 is connected to the network N (see FIG. 2) by wired or wirelessly and transmits or receives information to or from other information processing apparatuses, such as the terminal device 10, the management association terminal 50, and the node 20 of the blockchain system 2.

The storage unit 120 is embodied by, for example, a semiconductor memory device such as random access memory (RAM) or flash memory or by a storage device such as a hard disk or optical disc drive. As illustrated in FIG. 3, the storage unit 120 according to an embodiment includes a right holder information storage unit 121, a content information storage unit 122, a consensus information storage unit 123, and a function information storage unit 124. Moreover, although not illustrated, the storage unit 120 can store various types of information, such as an image that is the basis of an image to be provided to the terminal device 10.

Figure 4:
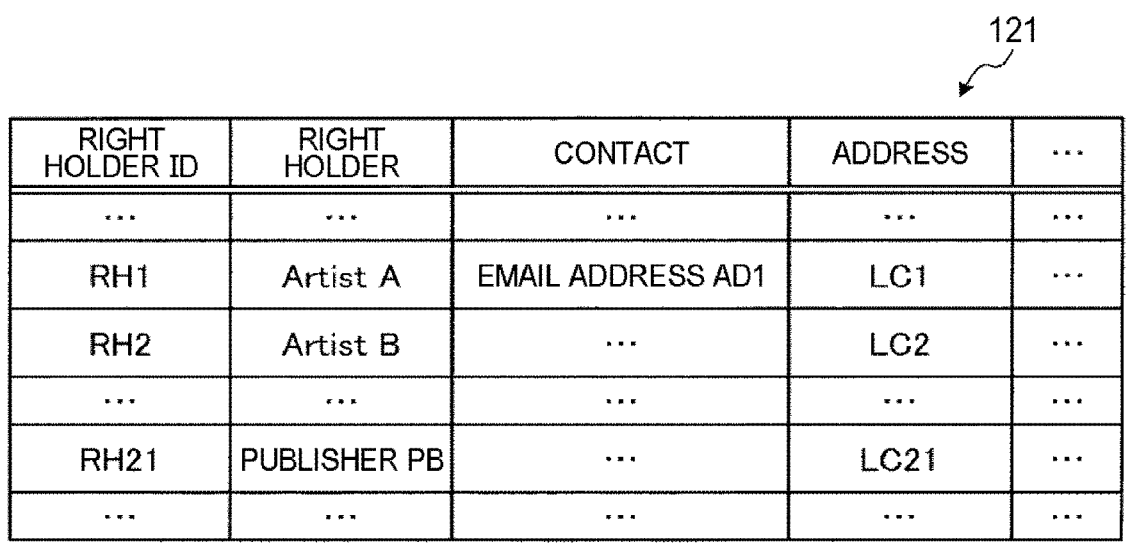
FIG. 4 is a diagram illustrating an example of a right holder information storage unit according to an embodiment of the present disclosure.

The right holder information storage unit 121 according to an embodiment stores various types of information (right holder information) regarding a right holder who holds the right for the content (copyrighted work). FIG. 4 is a diagram illustrating an example of a right holder information storage unit according to an embodiment of the present disclosure. In the example illustrated in FIG. 4, the right holder information storage unit 121 has items of "Right holder ID", "Right holder", "Contact", and "Address".

In the example, the item "Right holder ID" indicates identification information used to identify the right holder. The item "Right holder" indicates the name of the right holder identified by the right holder ID. Moreover, in the example illustrated in FIG. 4, a specific name is registered for the item "Right holder" though it is indicated as an abstract sign of "Artist A".

Further, the item "Contact" indicates the means of contacting the right holder of the corresponding rights. Moreover, in the example of FIG. 4, although it is indicated as an abstract sign such as "email address AD1", a specific address (character string) of "abc . . . @ . . . xxx.jp" is registered. In addition, although the case where an email address of each right holder is stored as the item "Contact" is illustrated, the item "Contact" is various types of information such as a telephone number as long as the information is transmittable to the right holder.

The item "Address" indicates the address corresponding to the right holder that is identified by the right holder ID. In one example, in the case where the right holder is a natural person, it can be the home address of the natural person. In addition, for example, in the case where the right holder is a legal entity, it can be the location of the head office of the legal entity. Moreover, in the example illustrated in FIG. 4, the item "Address" is listed as an abstract sign such as "LC1", but can be an area name or an address. In addition, for example, the item "Address" can be information indicating latitude and longitude.

In one example, in the example illustrated in FIG. 4, the right holder ID "RH1" indicates that the right holder (right holder RH1) is called "Artist A". The means of contacting the right holder RH1 indicates email address AD1. In addition, the right holder RH1 indicates that the address is "LC1".

Moreover, the right holder information storage unit 121 is not limited to the above example and can store various types of information depending on their usage. The right holder information storage unit 121 can store various types of information regarding the right holder, such as the age, gender, and workplace of the right holder.

The content information storage unit 122 according to an embodiment stores various types of information relating to the content (copyrighted work). FIG. 5 is a diagram illustrating an example of a content information storage unit according to an embodiment. The content information storage unit 122 illustrated in FIG. 5 has items of "Content ID", "Category", "Content", "Data", and "Right information".

The item "Content ID" indicates identification information used to identify the content. The item "Category" indicates a category (categorization) of the content. The item "Content" indicates the appellation or the like of the content. The item "Data" indicates content data. In one example, in a case where the category is a musical piece, the item "Data" stores data in an audio file format such as MPEG-1 audio layer-3 (MP3) or adaptive transform acoustic coding (ATRAC). In FIG. 5, an example in which conceptual information of "MDT1" is stored in the item "Data" is illustrated, but in practical, data itself or a file path name indicating the storage location thereof is stored.

The item "Right information" has items of "Right holder", "Share", "Presence or absence of moral rights", and "Intention to exercise". The item "Right holder" indicates the right holder of the content. In the example of FIG. 5, the case where the right holder ID is stored in the item "Right holder" is illustrated, but any information, for example, an appellation of the right holder, can be used as long as the right holder can be identified. The item "Share" indicates the rights share (proportion) of each right holder to the content.

Further, the item "Presence or absence of moral rights" indicates whether or not each right holder has the author's moral rights for the content. In the case where the item "Presence or absence of moral rights" is "Yes", it indicates that the right holder has the author's moral rights for the content. Moreover, in the example of FIG. 5, if the item "Presence or absence of moral rights" is "Yes", the target of rights such as composition or lyrics is listed in parentheses.

The item "Intention to exercise" indicates the intention of each right holder to exercise the author's moral rights. The item "Intention to exercise" has various items corresponding to the author's moral rights, such as the item "Rights to integrity" and the item "Rights of attribution". The item "Rights to integrity" indicates whether or not the right holder intends to exercise the rights to integrity. The item "Rights of attribution" indicates whether or not the right holder intends to exercise the rights of attribution.

In the example of FIG. 5, the musical piece MA identified by the content ID "CT1" (content CT1) indicates that the category is "Musical piece" and the data is "MDT1". In addition, it is indicated that the right holders of the musical piece MA are right holders RH1, RH2, and RH21. It is indicated that the right holder RH1 has a share of 25% and has the author's moral rights regarding the composition. In other words, it is indicated that the right holder RH1 is a composer of the musical piece MA. It is indicated that the right holder RH1 has no intention to exercise the rights to integrity and has an intention to exercise the rights of attribution. It is indicated that the right holder RH2 has a share of 25% and has the author's moral rights regarding the lyrics. In other words, it is indicated that the right holder RH2 is a composer of the musical piece MA. It is indicated that the right holder RH2 has no intention to exercise the rights to integrity and has an intention to exercise the rights of attribution. It is indicated that the right holder RH21 has a share of 50% and has no author's moral rights.

Moreover, the content information storage unit 122 is not limited to the above example and can store various types of information depending on their usage. In one example, the content information storage unit 122 can store information regarding the content acquisition date and time or the content creation date.

Figure 6:
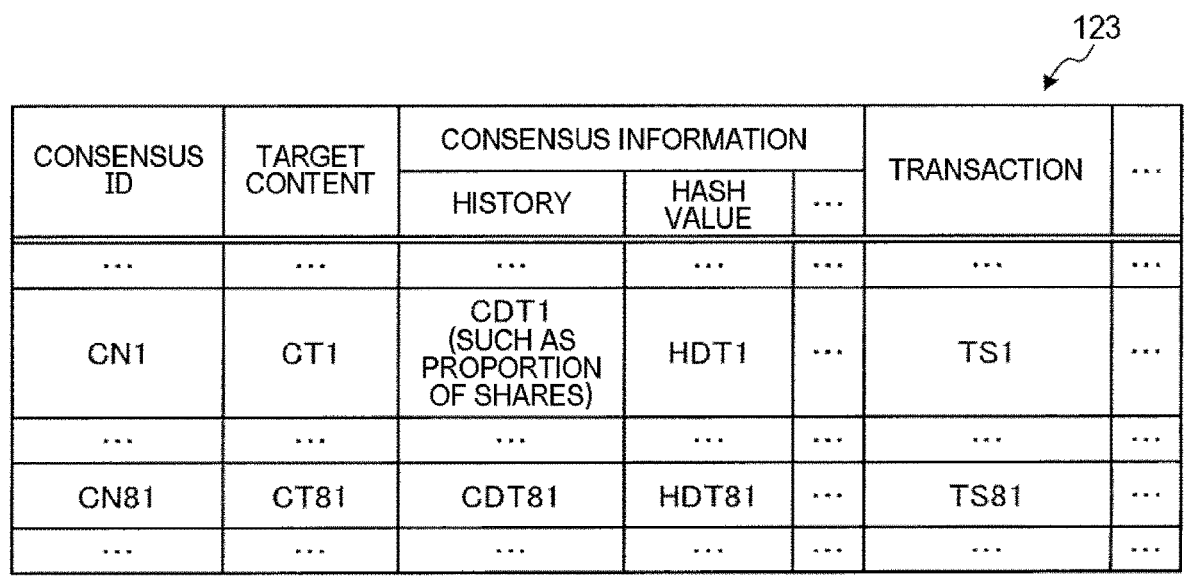
FIG. 6 is a diagram illustrating an example of a consensus information storage unit according to an embodiment of the present disclosure.

The consensus information storage unit 123 according to an embodiment stores information relating to the agreement (consensus) (consensus information). In one example, the consensus information storage unit 123 stores consensus information regarding the rights of the content (copyrighted work). FIG. 6 is a diagram illustrating an example of a consensus information storage unit according to an embodiment of the present disclosure. In the example illustrated in FIG. 6, the consensus information storage unit 123 includes items of "Consensus ID", "Target content", "Consensus information", and "Transaction".

The item "Consensus ID" indicates identification information used to identify the consensus. The item "Target content" indicates content that is a target of consensus. The example of FIG. 6 illustrates the case where the content ID is stored in the item "Target content", but any information can be used, for example, an appellation of the content, as long as the content can be identified.

Figure 7:
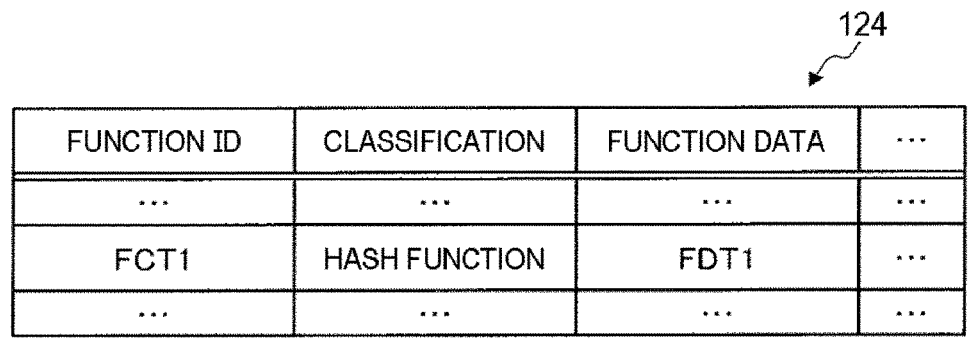
FIG. 7 is a diagram illustrating an example of a function information storage unit according to an embodiment of the present disclosure.

The item "Consensus information" stores information regarding the details of the consensus. The item "Consensus information" includes items "History" and "Hash value". The item "History" includes various types of log information such as the exchange between right holders until consensus is reached. In one example, the item "History" includes various types of log information such as communication of an email or message performed between right holders to determine the share proportion of the respective right holders. FIG. 6 illustrates an example in which conceptual information of "CDT1" is stored in the item "History", but in practical, various types of information such as character strings and audio or a file path name indicating a storage location thereof is stored. In the item "Hash value", a hash value obtained by converting the information stored in the item "History" by a predetermined hash function is stored. In one example, in the item "Hash value", a hash value generated by using the function FCT1 that is the hash function illustrated in FIG. 7 is stored. Moreover, the example of FIG. 6 illustrates the item "Hash value", but in the case where a function used for the conversion such as encoding or encryption is other than the hash function, an output value obtained from the function can be stored.

The item "Transaction" indicates the data of the generated transaction. FIG. 6 illustrates an example in which conceptual information of "TS1" is stored in the item "Transaction", but in practical, information to be registered with the blockchain or a file path name indicating a storage location thereof is stored in the item "Transaction". In one example, the item "Transaction" is information that digitizes the author's assertion of rights that is the source of the consensus. Alternatively, the item "Transaction" is information that includes a hash value generated from the history of the consensus, the rights share information other than the hash value, or the like. Moreover, the item "Transaction" can include various types of information as long as it is stored in the blockchain, not limited to the hash value or the rights share information other than the hash value. In one example, the item "Transaction" can include various types of information as illustrated in FIG. 23.

In the example of FIG. 6, the consensus identified by the consensus ID "CN1" (consensus CN1) indicates that the target content is the content CT1. In other words, the consensus CN1 indicates that it is a consensus regarding the rights of the musical piece MA, which is the content CT1. It is indicated that the history of the consensus CN includes the consensus information CDT1. The consensus information CDT1 includes the consensus on the share proportion of the respective right holders (right holders RH1, RH2, and RH21) of the musical piece MA. It is indicated that the consensus information CDT1 of the consensus CN1 is converted into the hash value HDT1. It is indicated that the transaction generated for the consensus CN1 indicates the transaction TS1.

Moreover, the consensus information storage unit 123 is not limited to the above example and can store various types of information depending on their usage. The consensus information storage unit 123 can store not only information used to identify the right holder who reaches the consensus in association with each consensus.

The function information storage unit 124 according to an embodiment stores information regarding a function used to convert the information. In one example, the function information storage unit 124 stores information relating to the function applied to encryption, encoding, or the like of information. FIG. 7 is a diagram illustrating an example of a function information storage unit according to an embodiment of the present disclosure. In the example illustrated in FIG. 7, the function information storage unit 124 includes items of "Function ID", "Classification", and "Function data".

The item "Function ID" indicates identification information used to identify a function. The item "Classification" indicates the type (classification) of each function. In one example, the item "Classification" indicates an appellation or the like of the type (classification) of each function. The item "Function data" indicates data of a function. Although FIG. 7 illustrates an example in which conceptual information of "FDT1" is stored in the item "Function data", in practical, various types of information of the corresponding function or a file path name indicating a storage location thereof is stored in the item "Function data".

The example of FIG. 7 indicates that the function identified by the function ID "FCT1" (function FCT1) corresponds to the hash function. The function data of the function FCT1 indicates that it is the function data FDT1. In one example, the function FCT1 can be various functions, such as a cryptographic hash function. In one example, the function FCT1 can be various functions, such as secure hash algorithm (SHA)-256, SHA-384, SHA-512, message-digest algorithm (MD) 5.

Moreover, the function information storage unit 124 is not limited to the above example and can store various types of information depending on their usage. In one example, the function information storage unit 124 can store not only the hash function but also the information regarding various types of functions used for information conversion.

The description continues by referring back to FIG. 3. The control unit 130 is embodied by, for example, a central processing unit (CPU), a micro processing unit (MPU), or the like that executes a program (e.g., a determination program such as an information processing program according to the present disclosure) stored in the information processing apparatus 100 by using a RAM or the like as a work area. In addition, the control unit 130 is a controller, and is embodied by, for example, an integrated circuit such as an application specific integrated circuit (ASIC) or a field programmable gate array (FPGA).

As illustrated in FIG. 3, the control unit 130 includes an acquisition unit 131, a determination unit 132, a processing unit 133, a notification unit 134, a reception unit 135, and a transmission unit 136. The control unit 130 implements or executes functions or operations of information processing described below. Moreover, the internal configuration of the control unit 130 is not limited to the arrangement illustrated in FIG. 3 and can be other arrangements as long as it is a configuration for performing information processing described later. In addition, the connection relation of the respective processing units included in the control unit 130 is not limited to the connection relation illustrated in FIG. 3 and can be other connection relations.

The acquisition unit 131 acquires various types of information. The acquisition unit 131 acquires various types of information from an external information processing apparatus. The acquisition unit 131 acquires various types of information from other information processing apparatuses such as the terminal device 10 or the management association terminal 50.

The acquisition unit 131 acquires various types of information from the storage unit 120. The acquisition unit 131 acquires various types of information from the right holder information storage unit 121, the content information storage unit 122, the consensus information storage unit 123, or the function information storage unit 124.

The acquisition unit 131 acquires various types of information determined by the determination unit 132. The acquisition unit 131 acquires various types of information generated by the processing unit 133. The acquisition unit 131 acquires various types of information notified by the notification unit 134. The acquisition unit 131 acquires various types of information received by the reception unit 135. The acquisition unit 131 acquires various types of information transmitted by the transmission unit 136.

The acquisition unit 131 acquires additional copyright additive information regarding the copyright of the content. The acquisition unit 131 acquires copyright additive information indicating the share held by the right holder of the copyright. The acquisition unit 131 acquires copyright additive information regarding the author's moral rights held by the author of the content. The acquisition unit 131 acquires copyright additive information regarding the author's moral rights that is the rights to integrity held by the author. The acquisition unit 131 acquires copyright additive information regarding the author's moral rights that is the rights of attribution held by the author.

The acquisition unit 131 acquires copyright additive information regarding the intention to exercise the author's moral rights by the author. The acquisition unit 131 acquires copyright additive information indicating that the author has no intention to exercise the author's moral rights. The acquisition unit 131 acquires copyright additive information indicating that the author has an intention to exercise the author's moral rights.

The acquisition unit 131 acquires consensus information indicating the agreement on the copyright between right holders of the copyright. The acquisition unit 131 acquires consensus information indicating the agreement between right holders of the copyright on the shares of the respective right holders of the copyright. The acquisition unit 131 acquires consensus information indicating the predetermined agreement between the respective right holders of the copyright. The acquisition unit 131 acquires the additional copyright additive information regarding the copyright of the content that is the musical piece.

In the example of FIG. 1, the acquisition unit 131 acquires the copyright additive information indicating that the right holder RH1, the right holder RH2, and the publisher PB have their respective shares on the musical piece MA at a proportion of "25:25:50" (the copyright additive information RDT1). The acquisition unit 131 acquires the copyright additive information RDT1 including the consensus information CDT1, the right holder RH1, and the right holder RH1.

The determination unit 132 judges various types of information. The determination unit 132 determines various types of information. In one example, the determination unit 132 determines various types of information on the basis of the information from the external information processing apparatus or the information stored in the storage unit 120. The determination unit 132 judges various types of information on the basis of the information from an external information processing apparatus or the information stored in the storage unit 120. The determination unit 132 determines various types of information on the basis of information from other information processing apparatuses such as the terminal device 10 or the management association terminal 50. The determination unit 132 determines various types of information on the basis of the information stored in the right holder information storage unit 121, the content information storage unit 122, the consensus information storage unit 123, or the function information storage unit 124.

The determination unit 132 determines various types of information on the basis of various types of information acquired by the acquisition unit 131. The determination unit 132 determines various types of information on the basis of various types of information generated by the processing unit 133. The determination unit 132 determines various types of information on the basis of various types of information received by the reception unit 135.

The determination unit 132 judges whether or not the shares held by the respective right holders on the copyright satisfies a predetermined condition. The determination unit 132 judges whether or not the total of the shares held by the respective right holders on the copyright exceeds a predetermined threshold. The determination unit 132 judges whether or not the copyright additive information includes information indicating that the copyright permits modifications of the content.

The processing unit 133 generates various types of information. The processing unit 133 generates various types of information on the basis of the information from an external information processing apparatus or the information stored in the storage unit 120. The processing unit 133 generates various types of information on the basis of information from other information processing apparatuses such as the terminal device 10 or the management association terminal 50. The processing unit 133 generates various types of information on the basis of the information stored in the right holder information storage unit 121, the content information storage unit 122, the consensus information storage unit 123, or the function information storage unit 124.

The processing unit 133 generates various types of information on the basis of various types of information acquired by the acquisition unit 131. The processing unit 133 generates various types of information on the basis of various types of information determined by the determination unit 132. The processing unit 133 generates various types of information on the basis of various types of information determined by the reception unit 135.

The processing unit 133 generates a transaction for storing the copyright additive information acquired by the acquisition unit 131 in the blockchain. In the case where the acquisition unit 131 acquires the consensus information, the processing unit 133 generates a transaction for storing the copyright additive information in the blockchain. The processing unit 133 generates a transaction for storing the copyright additive information including the consensus information in the blockchain. The processing unit 133 generates a transaction for storing the copyright additive information acquired by the acquisition unit 131 in the blockchain that registers the information regarding the rights of the musical piece.

The processing unit 133 appropriately uses various techniques to generate various types of information, such as a screen (image information) to be provided to an external information processing apparatus. The processing unit 133 generates a screen (image information) or the like to be provided to the terminal device 10. In one example, the processing unit 133 generates a screen (image information) or the like to be provided to the terminal device 10 on the basis of the information stored in the storage unit 120.

The processing unit 133 can generate a screen (image information) or the like by any processing as long as the screen (image information) or the like to be provided to the external information processing apparatus can be generated. In one example, the processing unit 133 appropriately uses various techniques relating to image generation, image processing, or the like to generate a screen (image information) to be provided to the terminal device 10. In one example, the processing unit 133 appropriately uses various techniques such as Java (registered trademark) to generate a screen (image information) to be provided to the terminal device 10. Moreover, the processing unit 133 can generate a screen (image information) to be provided to the terminal device 10 on the basis of the format of CSS, JavaScript (registered trademark), or HTML. In addition, for example, the processing unit 133 can generate a screen (image information) in various formats such as joint photographic experts group (JPEG), graphics interchange format (GIF), or portable network graphics (PNG).

In the example of FIG. 1, the processing unit 133 generates a transaction TS1 used to store the copyright additive information in the blockchain in the blockchain system 2. The processing unit 133 generates the transaction TS1 using the consensus information CDT1. In one example, the consensus information can include the author's assertion of rights for each item, such as the author's share. Specifically, the processing unit 133 uses information indicating an agreement (consensus) on the share between the right holder RH1 and the right holder RH2 or information indicating the share on the musical piece MA of each right holder RH1, the right holder RH2, and the publisher PB to generate the transaction TS1. The processing unit 133 generates the transaction TS1 including the information indicating that the right holder RH1, the right holder RH2, and the publisher PB have their respective shares on the musical piece MA at a proportion of "25:25:50". The processing unit 133 generates the transaction TS1 including the consensus information CDT1 and information used to identify musical piece MA (such as a content ID). The processing unit 133 hashes the consensus information CDT1 using a predetermined hash function. The processing unit 133 generates a hash value HDT1 obtained by hashing the consensus information CDT1. Then, the information processing apparatus 100 creates the transaction TS1 including the hash value HDT1 and the information used to identify the musical piece MA (such as content ID).

The notification unit 134 notifies various types of information. The notification unit 134 notifies other information processing apparatuses such as the terminal device 10 or the management association terminal 50 of various types of information. In one example, the notification unit 134 notifies various types of information on the basis of the information from the external information processing apparatus or the information stored in the storage unit 120. The notification unit 134 notifies various types of information on the basis of information from other information processing apparatuses such as the terminal device 10 or the management association terminal 50. The notification unit 134 notifies various types of information on the basis of the information stored in the right holder information storage unit 121, the content information storage unit 122, the consensus information storage unit 123, or the function information storage unit 124.

The notification unit 134 notifies various types of information on the basis of various types of information acquired by the acquisition unit 131. The notification unit 134 notifies various types of information on the basis of various types of information determined by the determination unit 132. The notification unit 134 notifies various types of information on the basis of various types of information generated by the processing unit 133. The notification unit 134 notifies various types of information on the basis of various types of information received by the reception unit 135. The notification unit 134 gives notification by instructing the transmission unit 136 to transmit various types of information to the transmission unit 136.

The notification unit 134 gives a predetermined notification to each right holder in the case where the share held by each right holder on the copyright satisfies a predetermined condition. If the total of the shares held by respective right holders on the copyright exceeds a predetermined threshold, the notification unit 134 gives a predetermined notification to each right holder. In the case where a predetermined request relating to the content is made, the notification unit 134 gives a predetermined notification to the author. In the case where the copyright additive information includes information indicating that the copyright permits modifications to the content, the notification unit 134 gives a predetermined notification to the author.

The reception unit 135 receives various types of information. The reception unit 135 receives various types of information from an external information processing apparatus. The reception unit 135 receives various types of information from other information processing apparatuses such as the terminal device 10 or the management association terminal 50.

The reception unit 135 receives the copyright additive information indicating that the right holder RH1, the right holder RH2, and the publisher PB have their respective shares on the musical piece MA at a proportion of "25:25:50" (the copyright additive information RDT1). The reception unit 135 receives the copyright additive information RDT1 including the consensus information CDT1, the right holder RH1, and the right holder RH1.

The transmission unit 136 provides various types of information to an external information processing apparatus. The transmission unit 136 transmits various types of information to an external information processing apparatus. For example, the transmission unit 136 transmits various types of information to other information processing apparatuses such as the terminal device 10 or the management association terminal 50. The transmission unit 136 provides the information stored in the storage unit 120. The transmission unit 136 transmits the information stored in the storage unit 120.

The transmission unit 136 provides various types of information on the basis of information from other information processing apparatuses such as the terminal device 10 or the management association terminal 50. The transmission unit 136 provides various types of information on the basis of the information stored in the storage unit 120. The transmission unit 136 provides various types of information on the basis of the information stored in the right holder information storage unit 121, the content information storage unit 122, the consensus information storage unit 123, or the function information storage unit 124.

The transmission unit 136 transmits various types of information acquired by the acquisition unit 131. The transmission unit 136 transmits various types of information determined by the determination unit 132. The transmission unit 136 transmits various types of information generated by the processing unit 133. The transmission unit 136 transmits various types of information to be notified by the notification unit 134 in response to an instruction from the notification unit 134. The transmission unit 136 transmits various types of information received by the reception unit 135 to the terminal device 10.

The transmission unit 136 transmits the transaction generated by the processing unit 133 to the node 20 of the blockchain.

In the example of FIG. 1, the transmission unit 136 transmits the created transaction TS1 to the blockchain system 2 for registering it in the blockchain system 2. The transmission unit 136 transmits the transaction TS1 to a node 20-3 of the blockchain system 2.

[1-4. Configuration of Terminal Device According to Embodiment]

Figure 8:
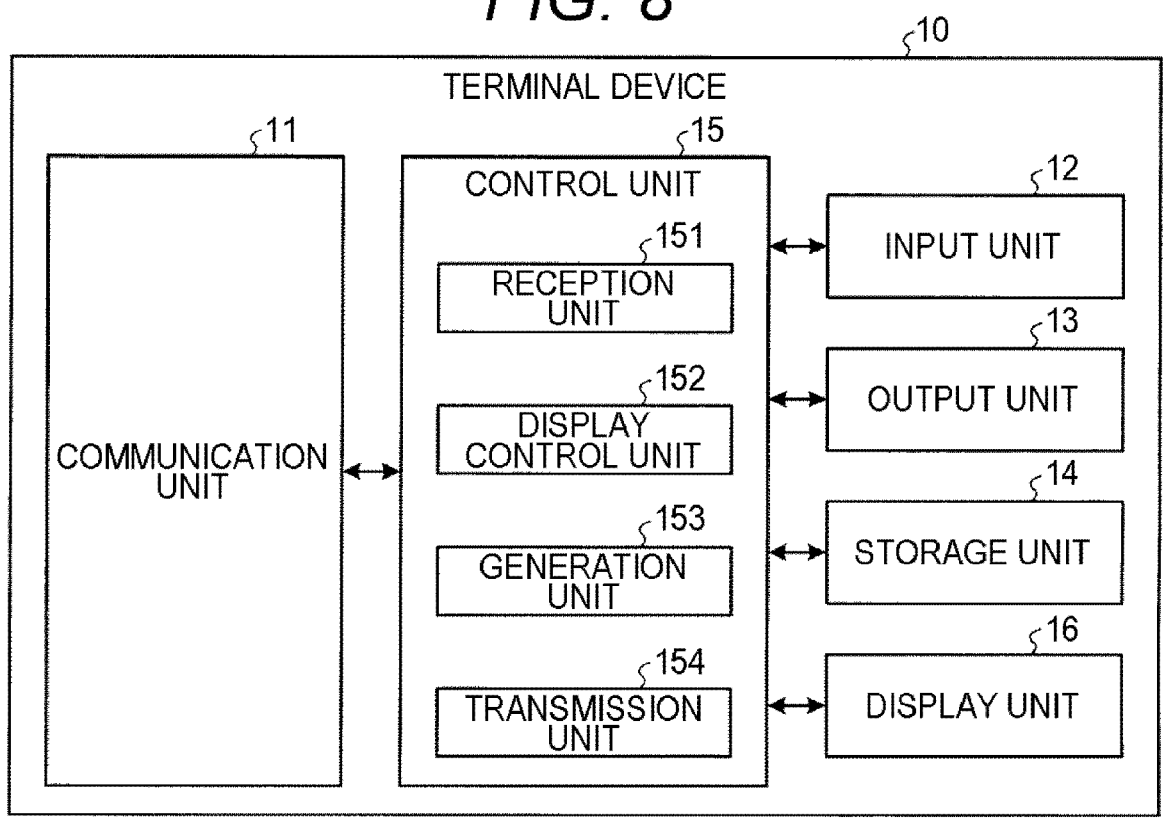
FIG. 8 is a diagram illustrating an exemplary configuration of a terminal device according to an embodiment of the present disclosure.

The description is now given of the configuration of the terminal device 10, which is an example of the information processing apparatus that executes the information processing according to an embodiment. FIG. 8 is a diagram illustrating an exemplary configuration of a terminal device according to an embodiment of the present disclosure.

As illustrated in FIG. 8, the terminal device 10 includes a communication unit 11, an input unit 12, an output unit 13, a storage unit 14, a control unit 15, and a display unit 16.

The communication unit 11 is embodied by, for example, an NIC, a communication circuit, or the like. The communication unit 11 is connected to a network N (such as the Internet) by wired or wirelessly, and transmits or receives information to or from other devices such as the information processing apparatus 100, the management association terminal 50, and the node 20 of the blockchain system 2 via the network N.

The input unit 12 receives inputs of various operations from the user. The input unit 12 receives a user's input. The input unit 12 receives a user's input using a keyboard or mouse. The input unit 12 receives as an input the user's model type selection. The input unit 12 receives as an input the error function selection by the user. The input unit 12 receives specifying information used by the user to specify the importance level. The input unit 12 receives specifying information used by the user to specify the importance level of the result information displayed on the display unit 16.

The input unit 12 receives from a user U1 the selection of a target to which an importance level is specified upon machine learning among the respective items in the matrix table included in an image IM1. The input unit 12 receives as an input the selection of a combination of correct solution label "9" and prediction label "4" by the user U1 in response to the operation of the user U1. The input unit 12 receives from the user U1 the importance level specified for the target selected by the user U1. The input unit 12 receives from the user U1 the specified correct solution label "9" and an importance level "2" of the prediction label "4".

The input unit 12 can have the function of detecting voice. In one example, the input unit 12 has a microphone that detects voice. The input unit 12 can receive the user's utterance as an input. In one example, the input unit 12 can receive various operations from the user through the display screen by the function of a touch panel embodied by various types of sensors. In other words, the input unit 12 can receive various operations from the user through the display unit 16 of the terminal device 10.

In this case, the input unit 12 receives an operation such as user-specified operations through the display unit 16 of the terminal device 10. In other words, the input unit 12 functions as a reception unit that receives a user's operation by the function of a touch panel. Moreover, a capacitive touch panel is employed widely in a tablet terminal as a technique of detecting the user's operation through the input unit 12. However, any other techniques can be employed, such as resistive, surface acoustic wave, infrared, or electromagnetic induction technique, as long as the user's operation can be detected and the touch panel function can be implemented. In addition, the terminal device 10 that is provided with a button or the like can have an input unit that also receives the user's operation using the button or the like.

The output unit 13 outputs various types of information. The output unit 13 has the function of outputting sound. In one example, the output unit 13 has a loudspeaker that outputs sound. Moreover, in the case where the terminal device 10 is configured not to output sound, it is not necessarily provided with the output unit 13.

The storage unit 14 is embodied, for example, by a semiconductor memory device such as RAM or flash memory or by a storage device such as a hard disk or optical disk drive. The storage unit 14 stores various types of information used to display the information.

The description continues by referring back to FIG. 8. The control unit 15 is embodied by, for example, a CPU, an MPU, or the like that executes a program (e.g., a display program such as an information processing program according to the present disclosure) stored in the terminal device 10 by using a RAM or the like as a work area. Further, the control unit 15 is a controller, and is embodied by, for example, an integrated circuit such as an ASIC or an FPGA As illustrated in FIG. 8, the control unit 15 includes a reception unit 151, a. display control unit 152, a generation unit 153, and a transmission unit 154, and implements or executes functions or operations of information processing described below. Moreover, the internal configuration of the control unit 15 is not limited to the arrangement illustrated in FIG. 8 and can be other arrangements as long as it is a configuration for performing information processing described later.

The reception unit 151 receives various types of information. The reception unit 151 receives various types of information from an external information processing apparatus. The reception unit 151 receives various types of information from other information processing apparatuses such as the information processing apparatus 100 or the management association terminal 50. The reception unit 151 receives an email or a message from other terminal devices 10.

The reception unit 151 receives control information from the information processing apparatus 100. The reception unit 151 receives an image from the information processing apparatus 100. The reception unit 151 receives an image including control information from the information processing apparatus 100. The reception unit 151 receives images IM11 to IM13, IM21 to IM23, and so on from the information processing apparatus 100.

The display control unit 152 controls various display indications. The display control unit 152 controls the display by the display unit 16. The display control unit 152 controls the display by the display unit 16 in response to the reception by the reception unit 151. The display control unit 152 controls the display by the display unit 16 on the basis of the information received by the reception unit 151. The display control unit 152 controls the display by the display unit 16 on the basis of the information generated by the generation unit 153. The display control unit 152 controls the display by the display unit 16 in response to the generation by the generation unit 153. The display control unit 152 controls the display by the display unit 16 so that an image 1 received from the information processing apparatus 100 is displayed on the display unit 16.

The display control unit 152 can control the display by the display unit 16 using an application (display application) that displays the images IM11 to IM13, IM21 to IM23, and so on. The display control unit 152 can be implemented by a display application. The display control unit 152 controls the display by the display unit 16 according to predetermined control information. In this regard, the control information is written in, for example, a scripting language such as JavaScript (registered trademark), CSS, or the like.

The generation unit 153 generates various types of information. The generation unit 153 generates various types of information on the basis of the information from an external information processing apparatus or the information stored in the storage unit 14. The generation unit 153 generates various types of information on the basis of information from other information processing apparatuses such as the terminal device 10 or the management association terminal 50. The generation unit 153 generates various types of information on the basis of the information received by the reception unit 151. The generation unit 153 generates an image to be displayed on the display unit 16 in response to the reception of an image through the reception unit 151.

The transmission unit 154 transmits various types of information to an external information processing apparatus. For example, the transmission unit 154 transmits various types of information to other information processing apparatuses such as the terminal device 10 or the management association terminal 50. The transmission unit 154 transmits the information stored in the storage unit 14.

The transmission unit 154 transmits various types of information on the basis of information from other information processing apparatuses such as the information processing apparatus 100. The transmission unit 154 transmits various types of information on the basis of the information stored in the storage unit 14.

The transmission unit 154 transmits an email or a message to other terminal devices 10 in response to an operation. The transmission unit 154 transmits an email to other terminal devices 10 in response to the user's operation.

The display unit 16 displays various types of information. The display unit 16 is embodied by, for example, a liquid-crystal display, an organic electro-luminescence (EL) display, or the like. The display unit 16 can be embodied by any means as long as it can display the information provided by the information processing apparatus 100. The display unit 16 displays various types of information in response to the control by the information processing apparatus 100. The display unit 16 displays various types of information depending on the control information received from the information processing apparatus 100 through the reception unit 151. The display unit 16 displays various types of information in response to the control by the display control unit 152. The display unit 16 displays an image provided by the information processing apparatus 100. The display unit 16 displays various types of information generated by the generation unit 153. The display unit 16 displays the images IM11 to IM13, IM21 to IM23, and so on.

Moreover, the processing described above, such as display control processing, generation processing, and display processing performed by the control unit 15, can be implemented by, for example, a predetermined application in each component of the control unit 15. In one example, the display control processing, the generation processing, the display processing, or the like by the control unit 15 can be implemented by the control information including JavaScript (registered trademark) or the like. In addition, in the case where the display control processing, the generation processing, the display processing, or the like described above is performed using a dedicated application, the control unit 15 can be provided with, for example, an application control unit that controls a predetermined application (e.g., such as web browser) or the dedicated application.

[1-5. Information Processing Procedure According to Embodiment]

Figure 9:
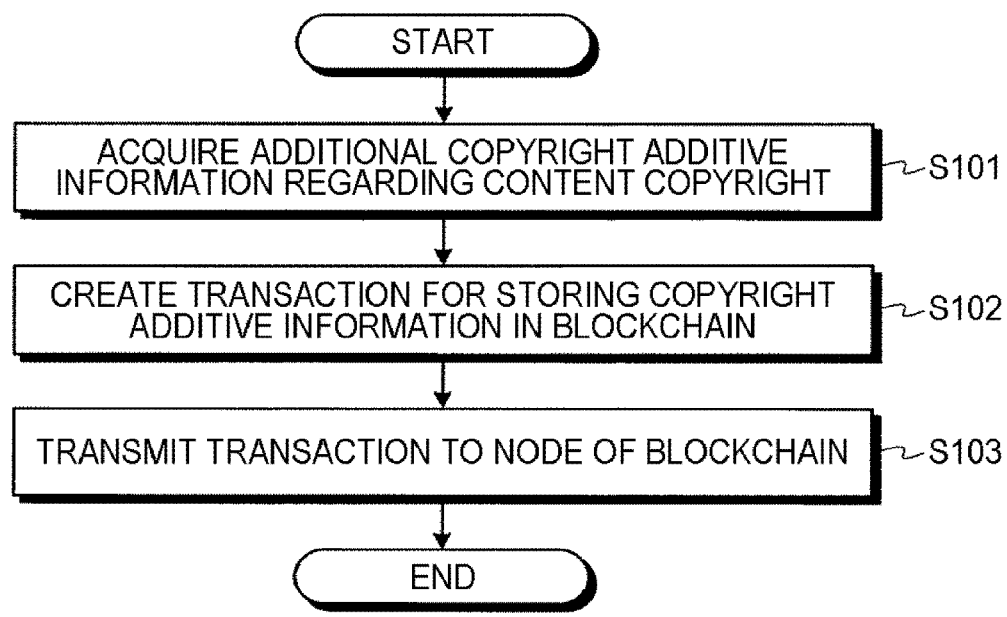
FIG. 9 is a flowchart illustrating the information processing procedure according to an embodiment of the present disclosure.

The procedure of various types of information processing according to an embodiment is now described with reference to FIG. 9. FIG. 9 is a flowchart illustrating the information processing procedure according to an embodiment of the present disclosure.

As illustrated in FIG. 9, the information processing apparatus 100 acquires additional copyright additive information regarding the content copyright (step S101). In one example, the information processing apparatus 100 acquires the copyright additive information indicating the presence or absence of the intention of the content's author to exercise the author's moral rights. In one example, the information processing apparatus 100 acquires the copyright additive information indicating the presence or absence of the intention of the content's author to exercise the rights to integrity or the rights of attribution.

The information processing apparatus 100 creates a transaction used to store the copyright additive information in the blockchain (step S102). In one example, the information processing apparatus 100 generates a transaction for storing in the blockchain the copyright additive information indicating the presence or absence of the intention of the content's author to exercise the author's moral rights. The information processing apparatus 100 transmits the transaction to a node of the blockchain (step S103). In one example, the information processing apparatus 100 transmits a transaction indicating the presence or absence of the intention of the content's author to exercise the author's moral rights to a node of the blockchain.

[1-6. Share Information]

Figure 10:
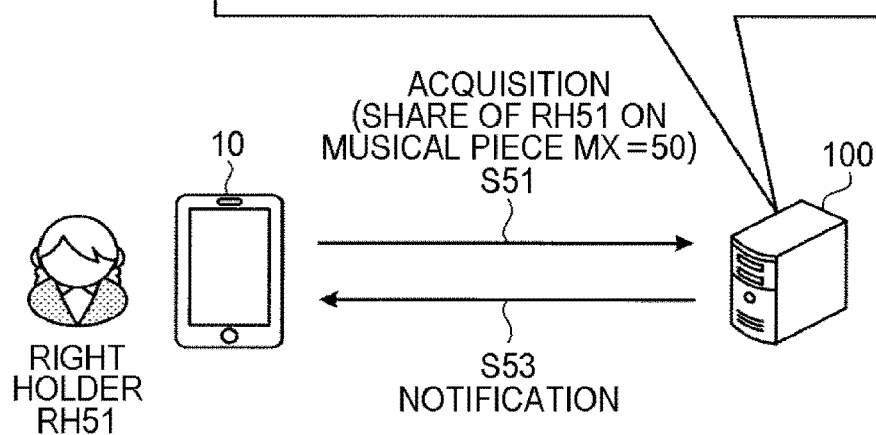
FIG. 10 is a diagram illustrating an example of an overview of notification regarding share.

In the case where the share held by each right holder on the copyright satisfies a predetermined condition, the information processing apparatus 100 can notify a predetermined right holder of the fact. In the case where the total of the shares held by the respective right holders on the copyright exceeds a threshold "100", the information processing apparatus 100 can give a predetermined notification to the right holders who request the registration of the shares having the total exceeding the threshold "100". The description in this regard is given with reference to FIG. 10. FIG. 10 is a diagram illustrating an example of an overview of notification regarding share. Moreover, in FIG. 10, the shares of the respective right holders are illustrated as a percentage, so the case of the threshold "100" is given. However, in the case where the shares of the respective right holders are shown at the ratio in a case where the whole is set to 1, the threshold can be set to "1".

The terminal device 10 used by a right holder RH51 first transmits copyright additive information (copyright additive information RDT51) indicating that the share of the right holder RH51 on the musical piece MX is "50" to the information processing apparatus 100. The information processing apparatus 100 acquires the copyright additive information (copyright additive information RDT51) indicating that the share of the right holder RH51 on the musical piece MX is "50" (step S51).

The information processing apparatus 100 determines whether to register the copyright additive information RDT51 with the blockchain of the blockchain system 2 (step S52). In one example, the information processing apparatus 100 uses the information indicating the share on the musical piece MX to judge whether to register the copyright additive information RDT51, which indicates that the share of the right holder RH51 on the musical piece MX is "50", with the blockchain of the blockchain system 2. In the example of FIG. 10, the information processing apparatus 100 acquires information (share information) indicating the shares of the right holders on the musical piece MX from the storage unit 120 (such as the content information storage unit 122). Moreover, the information processing apparatus 100 can acquire the information indicating the shares of the right holders on the musical piece MX from the blockchain system 2. In one example, the information processing apparatus 100 can acquire the information indicating the shares of the right holders on the musical piece MX from the blockchain system 2 by transmitting information (such as a content ID) used to identify the musical piece MX to the blockchain system 2.

The information processing apparatus 100 acquires the share information on the musical piece MX, which indicates that a right holder RH31 and a right holder RH41 each have the right of "50%" on the musical piece MX. In this way, the information processing apparatus 100 acquires the share information indicating that the total is "100" by summing the share "50" of the right holder RH31 and the share "50" of the right holder RH41 on the musical piece MX. The information processing apparatus 100 calculates the total "150" upon adding the right holder RH51 to the right holder by adding the share "50" asserted by the right holder RH51 to the total share "100" of the right holder RH31 and the right holder RH41.

The information processing apparatus 100 determines that the copyright additive information RDT51 is not registered with the blockchain of the blockchain system 2 on the basis of the comparison result between the total "150" and the threshold "100". The total "150" exceeds the threshold "100", so the information processing apparatus 100 determines that the copyright additive information RDT51 is not registered with the blockchain of the blockchain system 2. In addition, the information processing apparatus 100 determines whether or not to notify the predetermined right holder on the basis of the comparison result between the total "150" and the threshold "100". The total "150" exceeds the threshold "100", so the information processing apparatus 100 determines that the information processing apparatus 100 gives a predetermined notification to the right holder RH51 who requests the registration of the share whose total exceeds the threshold "100". The information processing apparatus 100 notifies the right holder RH51 of predetermined information (step S53). In one example, the information processing apparatus 100 transmits information indicating that the total of the shares on the musical piece MX exceeds a predetermined threshold to the terminal device 10 of the right holder RH51 in a case where the share asserted by the right holder RH51 is added.

Further, the information processing apparatus 100 can give a notification to the right holder RH31 and the right holder RH41 who are other right holders on the musical piece MX. In one example, the information processing apparatus 100 transmits information indicating that the total of the shares on the musical piece MX exceeds a predetermined threshold to the terminal device 10 of the right holder RH31. This is performed by the assertion of the share on the musical piece MX by the new right holder RH51. The information processing apparatus 100 transmits information indicating that the total of the shares on the musical piece MX exceeds a predetermined threshold to the terminal device 10 of the right holder RH41 by the assertion of the share on the musical piece MX by the new right holder RH51. As described above, in the case where the total of the shares held by the respective right holders on the copyright exceeds a predetermined threshold, the information processing apparatus 100 gives a predetermined notification to each right holder.

[1-7. Author's Moral Rights Information]

Although the example described above shows the case where the information regarding the share on the copyright is used as the copyright additive information, the copyright additive information can be information regarding the author's moral rights.

In one example, the information processing apparatus 100, when acquiring the copyright additive information regarding the author's moral rights held by the author of the content, can store the copyright additive information regarding the author's moral rights in the blockchain system 2. The information processing apparatus 100 can generate a transaction for storing the copyright additive information regarding the author's moral rights held by the author of the content in the blockchain system 2 and transmit the transaction to the blockchain system 2. Accordingly, the blockchain system 2 registers (adds) a block, which includes information regarding the author's moral rights held by the author of the content, with the blockchain.

In one example, the information processing apparatus 100, when acquiring the copyright additive information regarding the rights to integrity held by the author of the content, can store the copyright additive information regarding the rights to integrity in the blockchain system 2. The information processing apparatus 100 can generate a transaction for storing the copyright additive information regarding the rights to integrity held by the author of the content in the blockchain system 2 and transmit the transaction to the blockchain system 2. Accordingly, the blockchain system 2 registers (adds) a block, which includes information regarding the rights to integrity held by the author of the content, with the blockchain.

In one example, the information processing apparatus 100, when acquiring the copyright additive information regarding the rights of attribution held by the author of the content, can store the copyright additive information regarding the rights of attribution in the blockchain system 2. The information processing apparatus 100 can generate a transaction for storing the copyright additive information regarding the rights of attribution held by the author of the content in the blockchain system 2 and transmit the transaction to the blockchain system 2. Accordingly, the blockchain system 2 registers (adds) a block, which includes information regarding the rights of attribution held by the author of the content, with the blockchain.

In one example, the information processing apparatus 100, when acquiring the copyright additive information regarding the intention of the author to exercise the author's moral rights, can store the copyright additive information regarding the intention of the author to exercise the author's moral rights in the blockchain system 2. The information processing apparatus 100 can generate a transaction for storing the copyright additive information regarding the intention of the content's author to exercise the author's moral rights in the blockchain system 2 and transmit the transaction to the blockchain system 2. Accordingly, the blockchain system 2 registers (adds) a block, which includes information regarding the intention of the content's author to exercise the author's moral rights, with the blockchain.

In one example, the information processing apparatus 100, when acquiring the copyright additive information indicating that the author does not intend to exercise the author's moral rights, can store the copyright additive information regarding the intention of the author to exercise the author's moral rights in the blockchain system 2. The information processing apparatus 100 can generate a transaction for storing the copyright additive information indicating that the author does not intend to exercise the author's moral rights of the content's author in the blockchain system 2 and transmit the transaction to the blockchain system 2. Accordingly, the blockchain system 2 registers (adds) a block, which includes information indicating that the author does not intend to exercise the author's moral rights of the content's author, with the blockchain.

In one example, the information processing apparatus 100, when acquiring the copyright additive information indicating that the author intends to exercise the author's moral rights, can store the copyright additive information regarding the intention of the author to exercise the author's moral rights in the blockchain system 2. The information processing apparatus 100 can generate a transaction for storing the copyright additive information indicating that the author intends to exercise the author's moral rights of the content's author in the blockchain system 2 and transmit the transaction to the blockchain system 2. Accordingly, the blockchain system 2 registers (adds) a block, which includes information indicating that the author intends to exercise the author's moral rights of the content's author, with the blockchain.

In the case where a predetermined request relating to the content is made, the information processing apparatus 100 gives a predetermined notification to the author. In the case where the copyright additive information includes information indicating that the copyright permits modifications to the content, the information processing apparatus 100 may give a predetermined notification to the author. The description in this regard is given with reference to FIG. 11. FIG. 11 is a diagram illustrating an example of an overview of notification regarding the author's moral rights.

A terminal device 10-61 used by a creator CR1 first transmits a request to exploit the musical piece MA by the creator CR1 as sampling to the information processing apparatus 100. The information processing apparatus 100 acquires information indicating the request of the creator CR1 to exploit the musical piece MA (step S61).

The information processing apparatus 100 determines whether the creator CR1 gives a predetermined notification to the author of the musical piece MA in response to the creator CR1's request to exploit the musical piece MA (step S62). In one example, the information processing apparatus 100 determines whether to give a predetermined notification to the author of the musical piece MA by using the copyright additive information indicating the presence or absence of the author's intention to exercise the author's moral rights of the musical piece MA. In the example of FIG. 11, the information processing apparatus 100 acquires the copyright additive information indicating the presence or absence of the intention to exercise the author's moral rights on the musical piece MA from the storage unit 120 (such as the content information storage unit 122). Moreover, the information processing apparatus 100 can acquire the copyright additive information indicating the presence or absence of the intention to exercise the author's moral rights on the musical piece MA from the blockchain system 2. In one example, the information processing apparatus 100 can acquire the copyright additive information indicating the presence or absence of the intention to exercise the author's moral rights on the musical piece MA from the blockchain system 2 by transmitting information (such as content ID) used to identify the musical piece MA to the blockchain system 2.

The information processing apparatus 100 acquires information indicating that the right holder who has the author's moral rights on the musical piece MA includes the right holder RH1, who is the composer, and the right holder RH2, who is the lyricist. In addition, the information processing apparatus 100 acquires information indicating that the right holder RH1, who is the composer, has no intention to exercise the rights to integrity. In addition, the information processing apparatus 100 acquires information indicating that the right holder RH2, who is the lyricist, has no intention to exercise the rights to integrity. Thus, the information processing apparatus 100 determines to give the predetermined notification to the right holders RH1 and RH2 who have the copyright using the copyright additive information.

The information processing apparatus 100 notifies the right holder RH1 of predetermined information (step S63). The information processing apparatus 100 transmits information indicating that the creator CR1 requests to exploit the musical piece MA as sampling to the terminal device 10-1 of the right holder RH1.

The information processing apparatus 100 notifies the right holder RH2 of predetermined information (step S64). The information processing apparatus 100 transmits information indicating that the creator CR1 requests to exploit the musical piece MA as sampling to the terminal device 10-2 of the right holder RH2. In the example of FIG. 11, the information processing apparatus 100 does not notify the right holder RH21, who does not have the author's moral rights on the musical piece MA. Moreover, the information processing apparatus 100 can also give a predetermined notification to the right holder RH21, who does not have the author's moral rights on the musical piece MA.

Further, the information processing apparatus 100 notifies the creator CR1 of predetermined information (step S65). The information processing apparatus 100 transmits information indicating that the exploitation of the musical piece MA as sampling by the creator CR1 is permitted to the terminal devices 10-61 of the creator CR1. The information processing apparatus 100 can judge that the creator CR1 is allowed to exploit the musical piece MA as sampling.

[1-8. Indication of Information]

The terminal device 10 receives or displays an input of copyright additive information from a right holder such as an author or a publisher in various manners. The description in this regard is given with reference to FIGS. 12 to 17.

[1-8-1. Display Example by DAW of Terminal Device]

In one example, the terminal device 10 used by an author (a right holder) such as a composer and lyricist can use various music-related applications (music applications) such as digital audio workstation (DAW) to display various types of information such as copyright additive information. Although a DAW is described as an example in FIGS. 12 to 14, the terminal device 10 can display various types of information such as copyright additive information using any music application as long as it is possible to display it on the terminal device 10 and the right holder is able to input the copyright additive information or the like.

Figure 12:
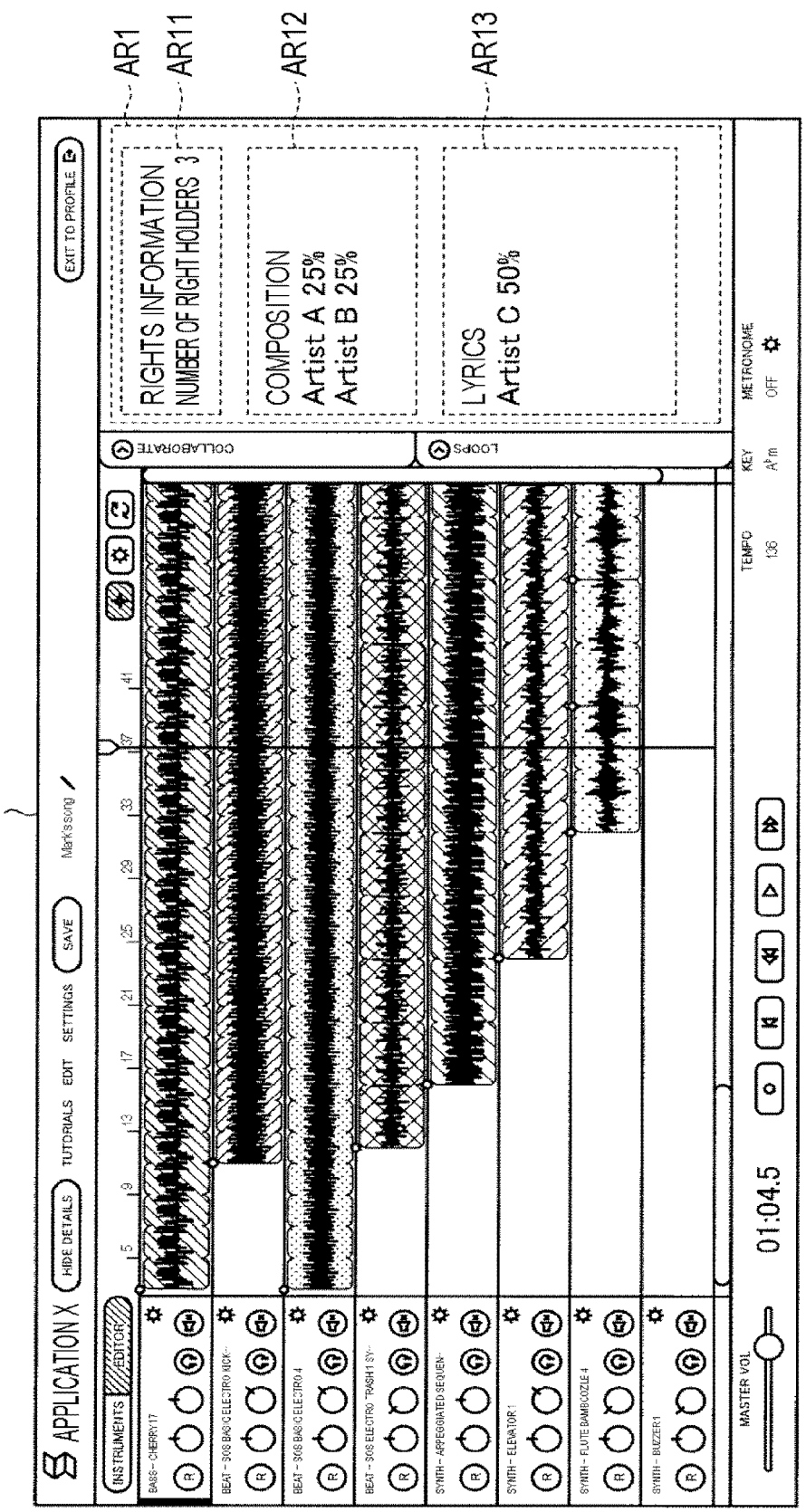
FIG. 12 is a diagram illustrating an example of an indication of information.

The display of right information of a musical piece using a DAW is now described with reference to FIG. 12. FIG. 12 is a diagram illustrating an example of an indication of information. Specifically, FIG. 12 is a diagram illustrating an example of a display screen (image) of right information of a musical piece using a DAW. FIG. 12 illustrates the display on the terminal device 10 in which an application X, which is a DAW application, is activated.

The example of FIG. 12 illustrates an example of the image IM11 that indicates the right information of the musical piece. The terminal device 10 displays the image IM11. The image IM11 that indicates the right information of the musical piece of the application X includes a display area AR1 in which the right information such as the copyright additive information is displayed. The information regarding a musical piece such as waveforms is displayed in an area other than the display area AR1 of the image IM11. In the display area AR1, right information regarding the musical piece (a musical piece MY) displayed on the image IM11 is displayed. In the first area AR11 of the display area AR1, information indicating that three right holders have the musical piece MY is displayed. In one example, the image IM11 is displayed on the terminal device 10 used by the right holder "Artist B".

Further, in the display area AR1, the second area AR12 shows that there are two composers of the musical piece MY, "Artist A" and "Artist B". It also indicates that the right holder "Artist A" as the composer has a share of 25% and the right holder "Artist B" as the composer has a share of 25°. In addition, in the display area AR1, the third area AR13 shows that the lyricist of the musical piece MY is one person, "Artist C". It also indicates that the right holder "Artist C" as the lyricist has a share of 50%.

The terminal device 10 can receive information to be displayed in the display area AR1 from the information processing apparatus 100 and display the received information in the display area AR1. In one example, the terminal device 10 can request the information processing apparatus 100 to transmit the information regarding the musical piece MY. Accordingly, the information processing apparatus 100 can transmit the information to be displayed in the display area AR1 to the terminal device 10. In addition, the terminal device 10 can receive information to be displayed in the display area AR1 from the blockchain system 2 and display the received information in the display area AR1.

In one example, the image IM11 can be displayed on the terminal device 10 used by a creator or the like (creator CR2) other than "Artist A", "Artist B", and "Artist C". This makes it possible for the creator CR2 to check the right holder of the musical piece MY.

Figure 13:
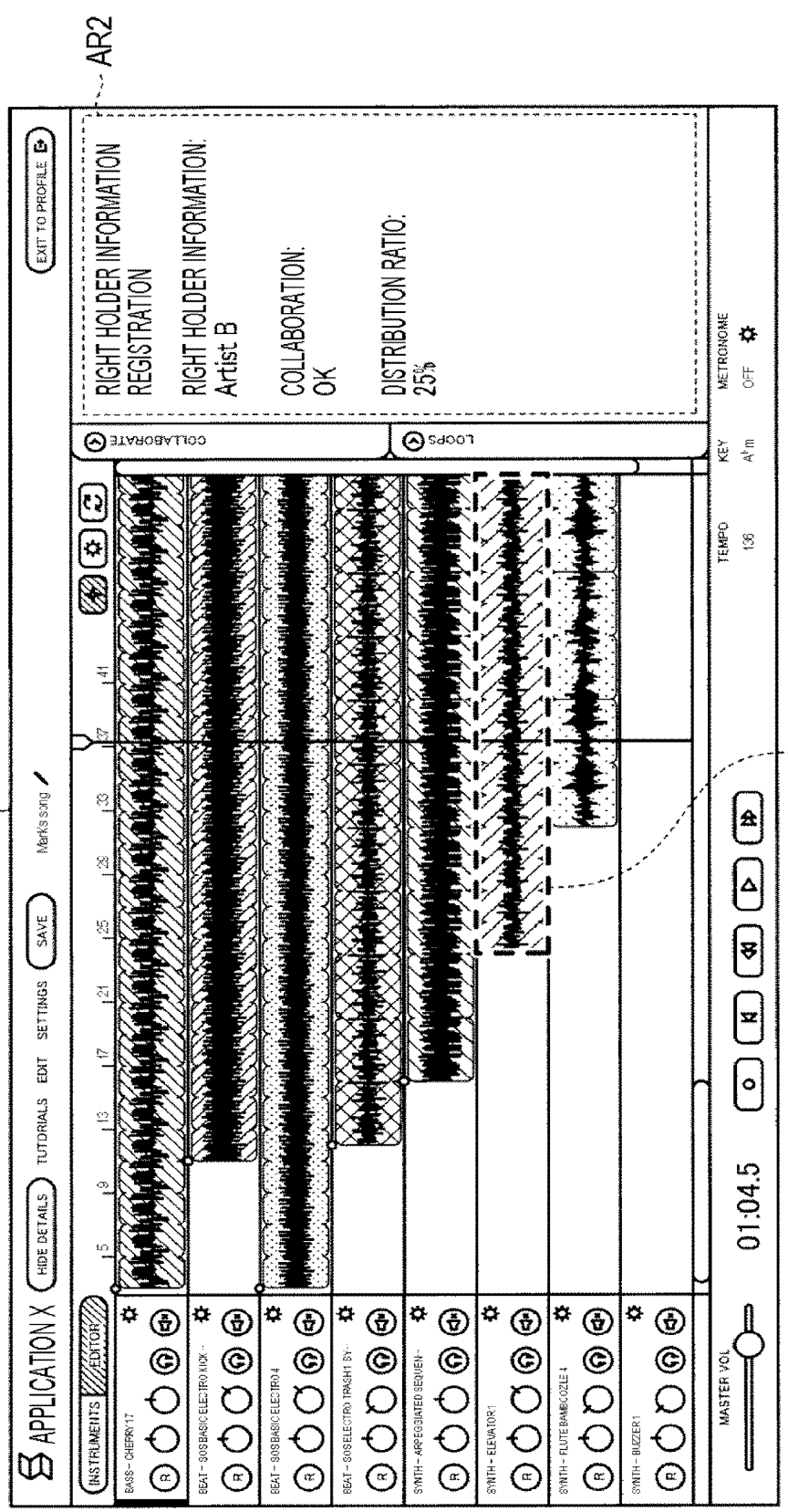
FIG. 13 is a diagram illustrating an example of an indication of information.

The display and registration of right information of a sample in the DAW are now described with reference to FIG. 13. FIG. 13 is a diagram illustrating an example of an indication of information. Specifically, FIG. 13 is a diagram illustrating an example of a right information registration screen (image) of a sample in the DAW. Moreover, those similar to FIG. 12 will be omitted as appropriate.

The example of FIG. 13 illustrates an example of the image IM12 that indicates the right information of the musical piece. The terminal device 10 displays the image IM12. The image IM12 that indicates the right information of the musical piece of the application X includes a display area AR2 that displays the right information registering a sample. In the display area AR2, the right information regarding a sample SP2 created by "Artist B" among the components of the musical piece (the musical piece MY) displayed on the image IM12 is displayed. The image IM12 corresponds to a state in which the sample SP2 is selected from the components of the musical piece (the musical piece MY).

The display area AR2 includes information indicating that the right holder of the sample SP2 is "Artist B". In addition, for the sample SP2, information indicating that the right holder "Artist B" permits the collaboration is included. It also includes information indicating that the right holder "Artist B" of the sample SP2 has a share of 25% on the musical piece created using the sample SP2. In one example, the image IM12 is displayed on the terminal device 10 used by the right holder "Artist B".

The right holder information is acquired from predetermined user information. The terminal device 10 acquires the right holder information to be displayed in the display area AR2 from the predetermined user information. In one example, the right holder (such as "Artist B") of a corresponding part of the information indicating the presence or absence of collaboration or its portion is input. In addition, the presence or absence of collaboration or its portion for each right holder can be set as a default value. In one example, the terminal device 10 can acquire information indicating a default value such as X % for the drum loop and B % for the sample of A seconds or less and can display the acquired default value as information indicating the presence or absence of collaboration or its portion. Moreover, the default value can be set on the basis of the customs or the like of each country. In one example, in the case of Japan, the default value can be set to capitation (per capita) for share, and the share for sample unit can be set to 10%.

The terminal device 10 can receive information to be displayed in the display area AR2 from the information processing apparatus 100 and display the received information in the display area AR2. In one example, the terminal device 10 can request the information processing apparatus 100 to transmit the information regarding the musical piece MY. Accordingly, the information processing apparatus 100 can transmit the information to be displayed in the display area AR2 to the terminal device 10. In addition, the terminal device 10 can receive information to be displayed in the display area AR2 from the blockchain system 2 and display the received information in the display area AR2.

In one example, the image IM12 can be displayed on the terminal device 10 used by a creator or the like (creator CR3) other than "Artist B". Accordingly, the creator CR3 is able to check whether or not the right holder of the sample SN2 or collaboration is possible.

Figure 14:
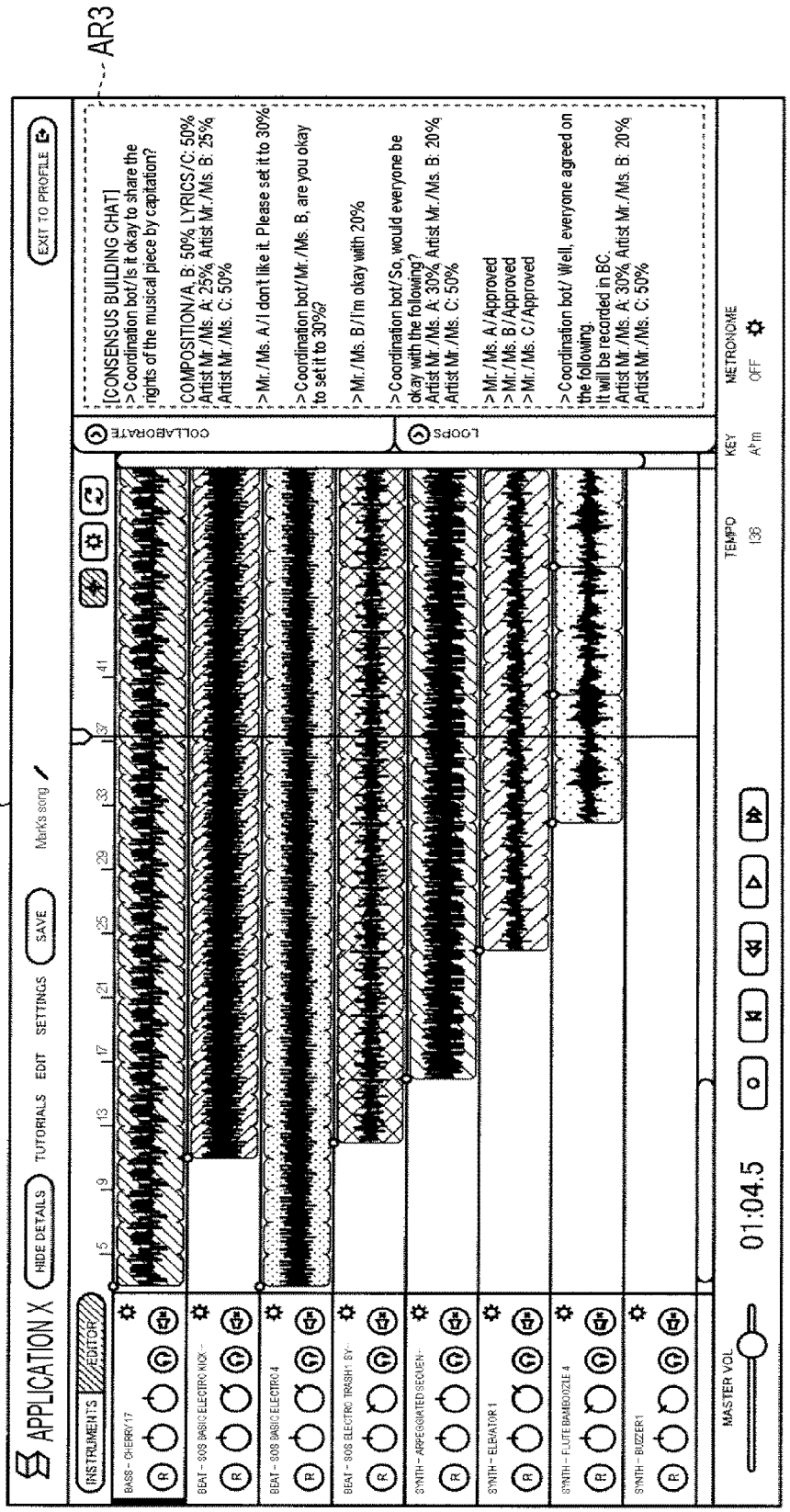
FIG. 14 is a diagram illustrating an example of an indication of information.

The consensus building of a musical piece in the DAW is now described with reference to FIG. 14. FIG. 14 is a diagram illustrating an example of an indication of information. Specifically, FIG. 14 is a diagram illustrating an example of a display screen (image) of the consensus building of a musical piece. Moreover, those similar to FIG. 12 will be omitted as appropriate.

The example of FIG. 14 illustrates an example of the image IM13 that indicates the right information of the musical piece. The terminal device 10 displays the image IM13. The image IM13 that indicates the right information of the musical piece of the application X includes a display area AR3 that displays information regarding consensus building for the musical piece. In the display area AR3, a message is displayed, which is exchanged between the respective right holders ("Artist A", "Artist B", and "Artist C") in the consensus building chatting and a bot (coordination bot) that assists the conversation for consensus building. In one example, the image IM13 is displayed on the terminal device 10 used by each of the right holders "Artist A", "Artist B", and "Artist C".

In the example of FIG. 14, the coordination bot suggests that "Artist A" and "Artist B" each have a share of 25%, and "Artist C" has a share of 50% on the basis of customs, default values, and previous performance of each right holder. On the other hand, the right holder "Artist A" requires that the own share be 30%. Then, the right holder "Artist B" is consent to reduce the own share from 25% to 20%.

Then, the coordination bot suggests again that the share of "Artist A" is 30%, the share of "Artist B" is 20%, and the share of "Artist C" is 50%. Then, all of "Artist A", "Artist B", and "Artist C" approve the suggestion. Accordingly, the application X records that "Artist A", "Artist B", and "Artist C" are consent to the suggestion that the share of "Artist A" is 30%, the share of "Artist B" is 20%, and the share of "Artist C" is 50%. Thus, the terminal device 10 stores the consensus information (consensus information CDT3) indicating that "Artist A", "Artist B", and "Artist C" are consent to the suggested share ratio in the storage unit 14. In one example, the terminal device 10 stores the text information of the details displayed in the display area AR3 as the consensus information CDT3.

In one example, the terminal device 10 transmits the consensus information CDT3 to the information processing apparatus 100. Then, the information processing apparatus 100 generates a transaction for storing the acquired consensus information CDT3 as the copyright additive information in the blockchain of the blockchain system 2. In one example, the information processing apparatus 100 generates a transaction including a hash value obtained by hashing the consensus information CDT3. Then, the information processing apparatus 100 transmits the generated transaction to the blockchain system 2. Accordingly, the blockchain system 2 adds a block indicating that "Artist A", "Artist B", and "Artist C" are consent to their respective shares to the blockchain. Thus, the information processing apparatus 100 is capable of registering the copyright additive information regarding the share of the right holder with the blockchain.

Moreover, although FIG. 14 illustrates a case where consensus building is performed by chatting in the display area AR3 in a separate frame, information regarding the consensus building can be acquired by various means. In one example, the history of the consensus reached part can be extracted automatically from the information of other applications such as chatting or messaging. In addition, in the consensus, it can be judged that the consensus is reached by displaying the share information of each right holder and the button for consensus and pressing the button by each right holder for reaching consensus.

[1-8-2. Display Example on Right Registration Screen of Terminal Device]

In one example, the terminal device 10 used by a supplier SP such as a publisher can display various types of information such as copyright additive information by a music-related application (music application) such as a management application (management application). The management application is described as an example in FIGS. 15 to 17. However, the terminal device 10 can register the copyright additive information or the like of the musical piece by using any music application as long as it is possible to display it on the terminal device 10 and the supplier SP can register the copyright additive information or the like of the musical piece.

The display of a list of registration applications of a musical piece to be registered such as musical pieces to the rights management association is first described with reference to FIG. 15. FIG. 15 is a diagram illustrating an example of an indication of information. Specifically, FIG. 15 is a diagram illustrating an example of a display screen (image) of a list of registration applications of a target in the management application. FIG. 15 describes as an example the display on the terminal device 10 in which the management application is activated.

The example of FIG. 15 shows an example of an image IM21 that displays a list of registration applications of a target. The terminal device 10 displays the image IM21. In one example, the image IM21 is displayed on the terminal device 10 used by the supplier SP. In the image IM21, a list of musical pieces managed by the supplier SP and information relating to the musical pieces is displayed. The list displayed on the image IM21 includes a title of a work, a filename, an author name, status, or the like for each target such as a musical piece.

Then, the edition of registration application information is described with reference to FIG. 16. FIG. 16 is a diagram illustrating an example of an indication of information. Specifically, FIG. 16 is a diagram illustrating an example of an editing screen (image) of registration application information. Moreover, those similar to FIG. 15 will be omitted as appropriate.

The example of FIG. 16 shows an example of an image IM22 used to edit the registration application information of the musical piece MA. In one example, the terminal device 10 displays the image IM22 by specifying the column of the title of the work "musical piece MA" in the image IM21 illustrated in FIG. 15. In one example, the terminal device 10 displays the image IM22 as a pop-up screen superimposed on the image IM21. The image IM22 shows information indicating that the author who is the lyricist of the musical piece MA is "Artist B" and the author who is the composer of the musical piece MA is "Artist A".

Further, the image IM22 includes an input area AR22 used to enter the share of each right holder. In the input area AR22, entry boxes for the shares corresponding to the lyricist "Artist B" and the composer "Artist A" are displayed. In one example, a predetermined administrator or the like of the supplier SP enters the shares of the respective right holders in the two entry boxes in the input area AR22. In the example of FIG. 16, "50"% is entered as the share for the lyricist "Artist B" and "50"% is entered as the share for the composer "Artist A". Moreover, the image IM22 is not necessarily provided with the input area AR 22.

In one example, the terminal device 10 transmits the copyright additive information (copyright additive information RDT3), such as the share shown in the image IM22, to the information processing apparatus 100. Then, the information processing apparatus 100 generates a transaction for storing the acquired copyright additive information RDT3 in the blockchain of the blockchain system 2. In one example, the information processing apparatus 100 generates a transaction including a hash value obtained by hashing the copyright additive information RDT3. Then, the information processing apparatus 100 transmits the generated transaction to the blockchain system 2. Accordingly, the blockchain system 2 adds a block indicating that the shares of "Artist A" and "Artist B" are both "50"% to the blockchain. Thus, the information processing apparatus 100 is capable of registering the copyright additive information regarding the share of the right holder with the blockchain.

Moreover, the terminal device 10 can notify an alert in a case where a total of shares of the respective right holders exceeds a predetermined threshold (e.g., such as "100") in the two entry boxes in the input area AR22. In the case where the total of shares of the respective right holders exceeds a predetermined threshold in the two entry boxes in the input area AR 22, the terminal device 10 can notify an alert by changing the display mode of the input area AR 22 or outputting a predetermined warning sound. In one example, the terminal device 10 can change the display color of the input area AR 22 in the case where the total of shares of the respective right holders exceeds a predetermined threshold in the two entry boxes in the input area AR 22. In addition, in the case where the total of shares of the respective right holders exceeds a predetermined threshold, a notification to perform coordination between the right holders can be given to each of the right holders. The result obtained by coordinating the share information of the respective right holders on the basis of the notification can be registered again.

The terminal device 10 can automatically input and display the shares determined depending on the right holders (authors) in the entry box of the share in the input area AR22. The terminal device 10 can automatically input and display the share of the right holder by using the previous coordination history of the right holder for the share. The terminal device 10 can use the previous coordination history of the right holder for the share. The terminal device 10 can notify the right holder of an alert in the case where the share entered for the right holder (author) does not meet the conditions calculated from the predetermined previous coordination history. The terminal device 10 can use the average value of the previous share history of the right holder as the threshold (a share threshold) of the right holder. In this case, the terminal device 10 can notify the right holder of an alert if the share entered for the right holder (author) does not meet the share threshold of the right holder (author).

In the case where the share entered for the right holder (author) does not meet the share threshold of the right holder (author), the terminal device 10 can notify the right holder of an alert by changing the display mode of the share entered for the right holder (author) or outputting a warning sound. In one example, in the case where the share entered for the right holder (author) does not meet the share threshold of the right holder (author), the terminal device 10 can change the display color of the share entered for the right holder (author).

The server communication history is now described with reference to FIG. 17. FIG. 17 is a diagram illustrating an example of an indication of information. Specifically, FIG. 17 is a diagram illustrating an example of a screen (image) of the server communication history. Moreover, those similar to FIG. 15 will be omitted as appropriate. In FIG. 17, information relating to the server communication history, which is the JavaScript object notation (JSON) history, is displayed in an image IM23. In one example, the image IM23 includes information such as the creation date and time and the creator. In one example, in FIG. 17, the information transmission history to the information processing apparatus 100 or the blockchain system 2 can be displayed in the image IM23.

[1-9. Configuration and Processing Example of System]

The configuration and processing described above are an example. The information processing system 1 can store the copyright additive information in the blockchain in various ways. The examples above show the case where the information processing apparatus 100 and the terminal device 10 are separate components, but these apparatus and device can be configured integrally. In one example, the terminal device 10 can have the function of the information processing apparatus 100, and the terminal device 10 can be an information processing apparatus having a function of generating a transaction stored in the blockchain system 2. As described above, the apparatus and device can be configured to be modified appropriately as long as the information processing system 1 is capable of storing the copyright additive information in the blockchain and being managed. In addition, the information processing system 1 can execute various processes. The information processing system 1 can execute processing including confirmation processing by the management association terminal 50. The description in this regard is given with reference to FIGS. 18 to 20.

Figure 18:
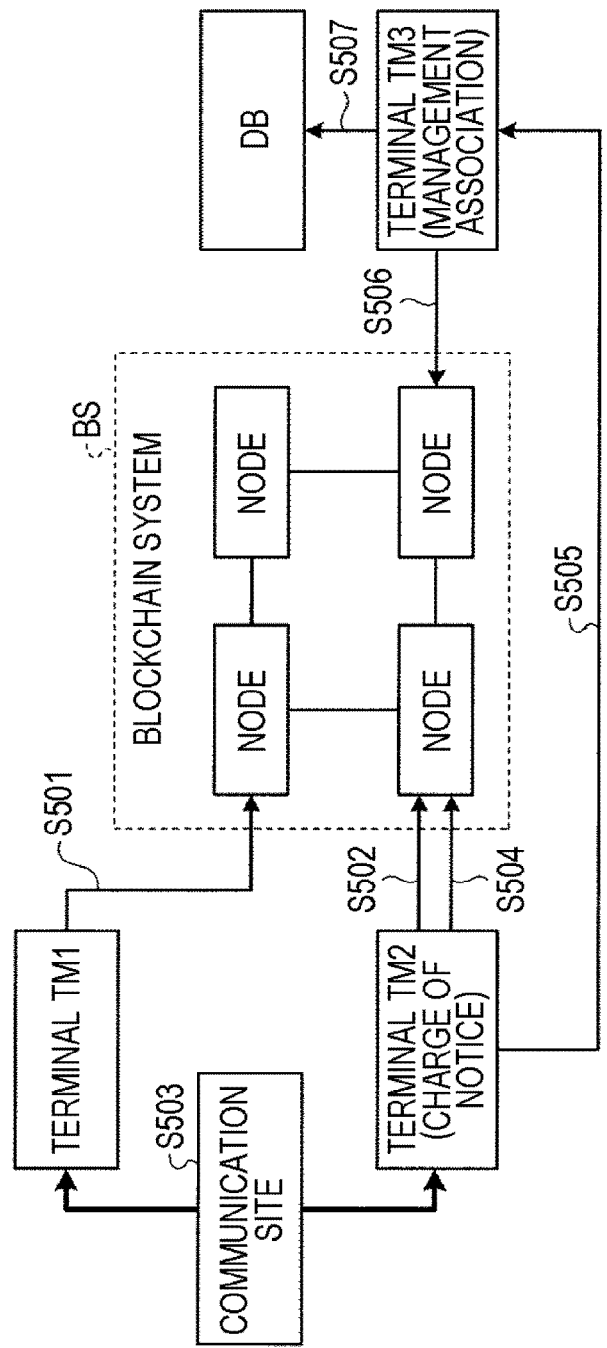
FIG. 18 is a diagram illustrating an example of processing regarding registration of information.

An example of the registration of an existing musical piece is first described with reference to FIG. 18. FIG. 18 is a diagram illustrating an example of processing regarding registration of information.

In the example of FIG. 18, a terminal TM1 writes the assertion of rights (step S501). In one example, the terminal TM1 is the terminal device 10 used by a right holder (a right holder RH61) regarding a predetermined musical piece (a musical piece MZ). In one example, the right holder RH61 is a music publisher (publisher). The terminal TM1 writes the assertion of rights in a blockchain system BS. The terminal TM1 writes the assertion of rights in the blockchain system BS by transmitting the generated transaction relating to the assertion of rights to the node of the blockchain system BS.

In addition, a terminal TM2 writes the assertion of rights (step S502). In one example, a terminal TM2 is a terminal device 10 used by the right holder (the right holder RH62) regarding the predetermined musical piece (the musical piece MZ). In one example, the right holder RH62 is a music publisher (publisher). Moreover, in the example of FIG. 18, the right holder RH62 is in charge of notice to the rights management association. The terminal TM2 writes the assertion of rights in a blockchain system BS. The terminal TM2 writes the assertion of rights in the blockchain system BS by transmitting the generated transaction relating to the assertion of rights to the node of the blockchain system BS.

Then, the right holders RH61 and RH62 coordinate their shares by off-chain, which is not processing on the blockchain (step S503). The right holders RH61 and RH62 coordinate their shares through a predetermined communication site. The terminal TM1 and the terminal TM2 coordinate the shares of the right holders RH61 and RH62 by communicating through a predetermined communication site.

Then, the terminal TM2 writes the agreed assertion of rights and the agreement log (step S504). The terminal TM2 writes the agreed assertion of rights and the agreement log in the blockchain system BS. The terminal TM2 transmits the transaction relating to the generated agreement to the node of the blockchain system BS by using the hash value or the like obtained by hashing the assertion of rights and the agreement log, so writes the assertion of rights and the agreement log in the blockchain system BS.

Then, the right holder RH62, who is in charge of notice, submits the notice information to the management association by off-chain (step S505). The right holder RH62 can send the notice information to the management association by mail. The right holder RH62 can send a notice document (the notice of work) including notice information NF1 as illustrated in FIG. 24 to the location of the management association. FIG. 24 is a diagram illustrating an example of notice information NF1 regarding a musical piece. Moreover, the information included in the notice information NF1 illustrated in FIG. 24 is an example, and the notice information includes various types of information received by the management association to which the notice information is submitted.

Further, information exchange between the right holder and the management association can be performed via a computer. The terminal TM2 of the right holder RH62 can transmit the notice information to the terminal TM3 used by the management association. The terminal TM3 is a management association terminal 50 used by the management association. The terminal TM2 can digitize the notice information NF1 as illustrated in FIG. 24 and transmit it to the terminal TM3. The terminal TM2 can digitize the information to be described in the notice information NF1 as illustrated in FIG. 24 and transmit it to the terminal TM3. The terminal TM2 can transmit a hash value obtained by hashing the assertion of rights and the agreement log to the terminal TM3.

Then, the management association that receives the notice information confirms the assertion of rights and the agreement log (step S506). The terminal TM3 can confirm the assertion of rights and the agreement log of the notice information of the terminal TM2 by transmitting the hash value received from the terminal TM2 to the blockchain system BS. In one example, the terminal TM3 receives the hash value of the copyright additive information, the hash value of the sound, and the identification information (content ID) of the musical piece from the terminal TM2. Then, the terminal TM3 transmits the hash value of the received copyright additive information, the hash value of the sound, and the identification information of the musical piece to the blockchain system BS. Accordingly, the terminal TM3 can confirm the assertion of rights and the agreement log of the notice information of the terminal TM2. Moreover, the confirmation described above is an example, and the assertion of rights and the agreement log are confirmed using the information stored in the blockchain system BS on the basis of the standard of the management association.

The management association registers the information with the database (DB) after confirming the assertion of rights and the agreement log (step S507). In the case where the confirming of the assertion of rights and the agreement log is completed, the terminal TM3 registers the musical piece corresponding to the notice information of the terminal TM2 with the DB.

In the example of FIG. 18, for example, the registration information corresponds to the coordination of the assertion of rights and the authenticity confirmation of the musical piece information by the blockchain. In one example, it is assumed that the person in charge of notice (author or music publisher) gives notice of musical piece information to a predetermined management association (e.g., such as JASRAC). In this case, each right holder (author and copyright holder) registers the assertion of rights (such as share) with the blockchain. In addition, if there is a discrepancy in the total of the assertion of rights, each right holder makes coordination. This coordination between right holders can be achieved by on-chain processing on the blockchain.

In addition, after obtaining the consensus of all right holders, the person in charge of the notice registers the evidence data of the acquisition of consensus (e.g., such as consensus information) with the blockchain. In one example, the evidence data can include a hash value and a timestamp generated from the authentication information of the right holder and the text of the log of the communication tool that led to the consensus building. In addition, the person in charge of notice (a representative right holder) notices the musical piece information (the notice of work) to the management association. The management association's system (a system including terminal TM3, DB, etc.) inquires on the blockchain that there is no discrepancy between the noticed musical piece information and the evidence data. Then, the management association officially registers the noticed musical piece information in the database (DB). In addition, in the case where the musical piece information (such as representative right holder or portion) changes, the assertion of rights of the old and new right holders is added up and re-noticed to the management association after obtaining a consensus. In addition, for the distribution of interests according to the share of rights, for example, if virtual currency according to interests is sent to a predetermined address where a smart contract is provided, the virtual currency can be sent to each right holder's address by a smart contract depending on the rights share information.

Further, in the example of FIG. 18, for example, the registration information corresponds to the registration of additional information regarding the exploitation of the musical piece. In one example, there is assumed the case where the representative right holder (an author or music publisher) registers additional information (license conditions regarding adaptation, sales, etc.) regarding the exploitation of the musical piece that is officially registered with the database of the management association. In this case, the representative right holder makes coordination between all right holders (author, music publisher, or master company) for additional information regarding the exploitation of the musical piece, and obtains a consensus. Moreover, if all right holders have nodes, consensus can be reached on-chain. In one example, the rights can be authorized by the performer.

Further, the representative right holder acquires a work ID (e.g., such as JASRAC code) of the musical piece. The representative right holder registers additional information regarding the exploitation and evidence data of consensus acquisition with the blockchain together with the work ID of the musical piece.

Figure 19:
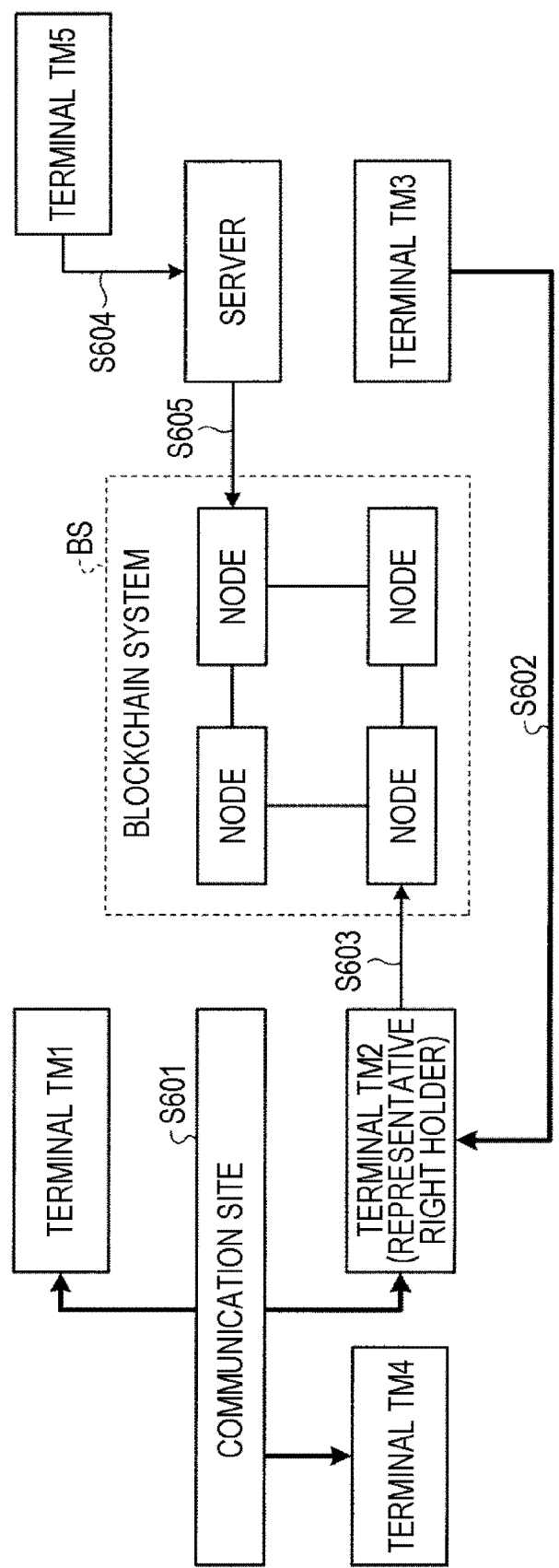
FIG. 19 is a diagram illustrating an example of processing regarding exploitation.

An example of using a sample is now described with reference to FIG. 19. FIG. 19 is a diagram illustrating an example of processing relating to exploitation. Moreover, in FIG. 19, those similar to FIG. 18 will be omitted as appropriate.

In the example of FIG. 19, right holders RH61, RH62, and RH64 coordinate the exploitation conditions off-chain (step S601). The right holders RH61, RH62, and RH64 coordinate the exploitation conditions for a predetermined musical piece (the musical piece MZ) via a predetermined communication site. In one example, a terminal TM4 is a terminal device 10 used by the right holder (the right holder RH64) regarding the predetermined musical piece (the musical piece MZ). In one example, the right holder RH64 is a right holder or a master company. The terminal TM1, the terminal TM2, and the terminal TM4 coordinate the exploitation conditions relating to the predetermined musical piece (the musical piece MZ) by the communication through the predetermined communication site.

Then, the terminal TM2 acquires the work ID from the terminal TM3 used by the management association (step S602). The terminal TM2 acquires the work ID (such as a content ID) from the terminal TM3 by requesting the work ID that identifies a predetermined musical piece (the musical piece MZ) from the terminal TM3 used by the management association.

Then, the terminal TM2 writes the work ID, the exploitation conditions, and the consensus log (step S603). The terminal TM2 writes the work ID (such as a content ID) of the predetermined musical piece (the musical piece MZ), the exploitation conditions of the predetermined musical piece (the musical piece MZ), and the consensus log between the right holders of the predetermined musical piece (the musical piece MZ) (Step S603).

Then, the server acquires a usage request based on the work ID from the terminal TM5 (step S604). In one example, the terminal TM5 is a terminal device 10 used by a creator who desires to exploit the predetermined musical piece (the musical piece MZ). In addition, the server is a server device used by the service provider. The server may be a server device used by a business operator (a sampling service business operator) that provides a service related to sampling music production.

Then, the server confirms the exploitation conditions (step S605). In one example, the server confirms the exploitation conditions of the predetermined musical piece (the musical piece MZ) by transmitting the work ID (such as the content ID) of the predetermined musical piece (the musical piece MZ) acquired from the terminal TM5 to the blockchain system BS. The server can notify the terminal TM5 of the exploitation conditions of the confirmed predetermined musical piece (the musical piece MZ). The server can transmit information regarding the exploitation conditions of the confirmed predetermined musical piece (the musical piece MZ) to the terminal TM5.

The example of FIG. 19 illustrates an example of processing related to sampling music production. In one example, it is assumed that a user (creator) uses a service (system) to create a derivative work and register it as a new musical piece. In this case, the service (system) acquires the musical piece information of the musical piece from the database of the management association or the right holder and additionally acquires the additional information regarding the exploitation of the musical piece from the blockchain. In addition, the sampling condition information is recorded in a database of a service (system) such as a sampling service provider. The service (system) adds up the license conditions for all the musical pieces exploited. Then, if there is a discrepancy, a warning is displayed. In addition, the user confirms that there is no discrepancy in the sum of the license conditions of all the musical pieces exploited and the assertion of rights of all users. The user notices a new musical piece as a derivative work.

Figure 20:
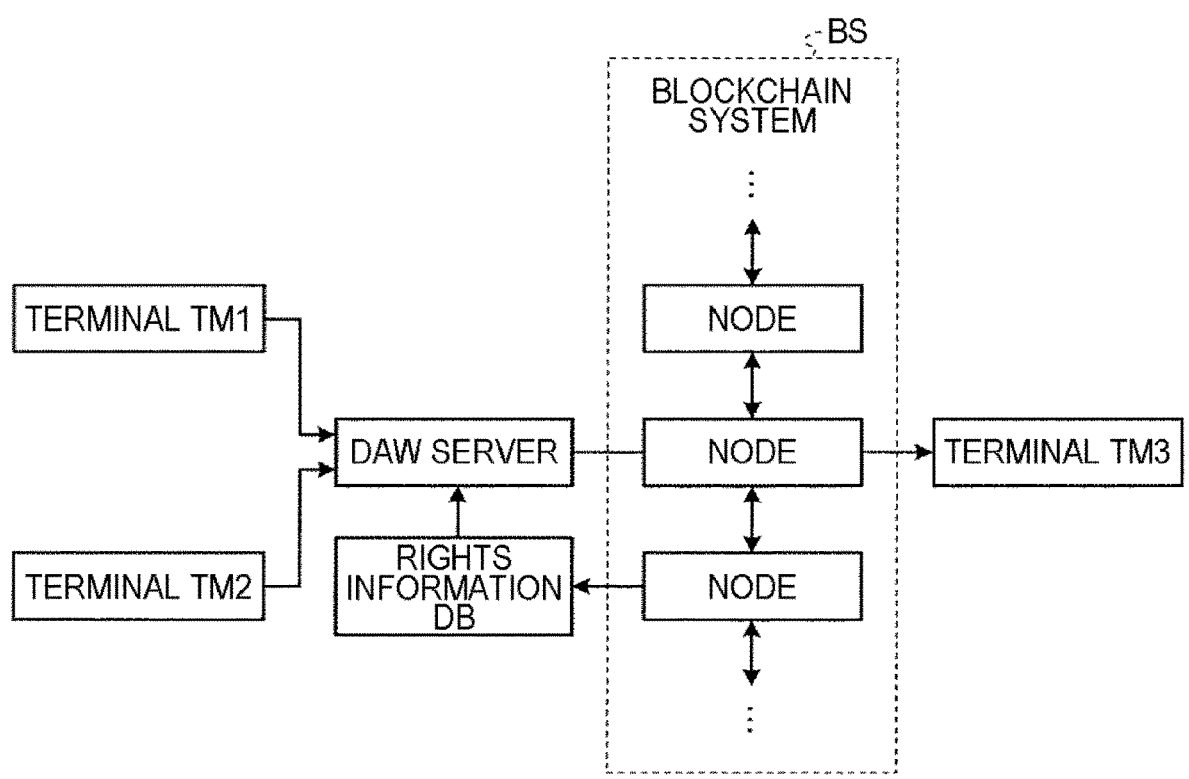
FIG. 20 is a diagram illustrating an example of a configuration including a DAW.

An example of recording the rights information by a DAW is now described with reference to FIG. 20. FIG. 20 is a diagram illustrating an example of a configuration including a DAW. Moreover, in FIG. 20, details similar to FIG. 18 will be omitted as appropriate. A DAW server illustrated in FIG. 20 is a server device for providing various services related to DAW. In one example, the DAW server illustrated in FIG. 20 can be the information processing apparatus 100.

Then, the terminal TM1 or the terminal TM2 displays the images IM11 to IM13 as illustrated in FIGS. 12 to 14 on the basis of the information acquired from the DAW server. The terminal TM1 or the terminal TM2 writes the right information such as the copyright additive information to the blockchain system BS via the DAW server. The DAW server acquires information to be stored in the blockchain system BS from the right information DB, creates a transaction, and transmits the generated transaction to the node of the blockchain system BS.

[1-10. Data Structure]

Figure 21:
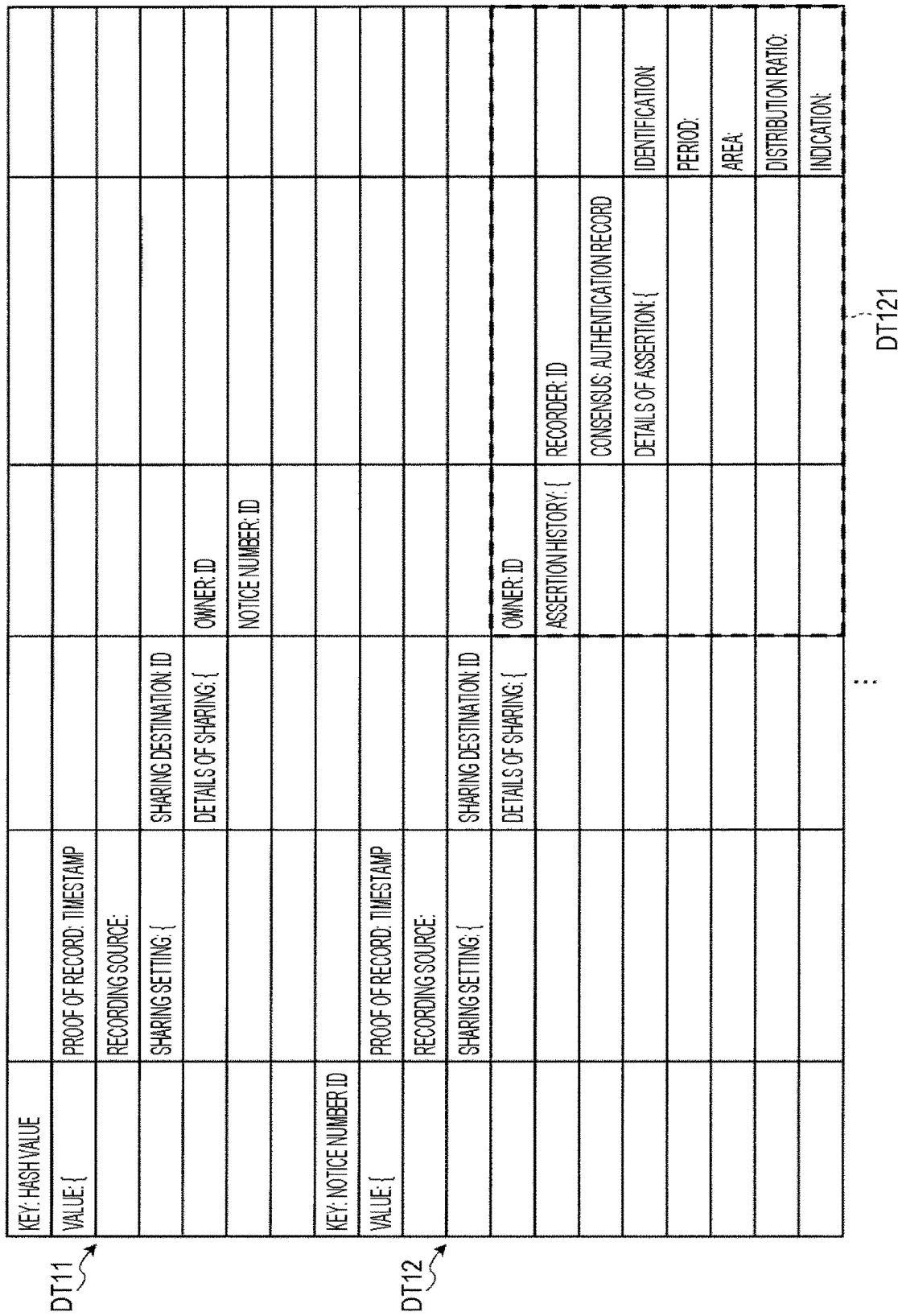
FIG. 21 is a diagram illustrating an example of a data configuration including copyright additive information.

Moreover, the data structure used in the information processing system 1 can be any data structure as long as the copyright additive information can be stored in the blockchain and it is manageable. The description in this regard is given with reference to FIGS. 21 and 22. FIGS. 21 and 22 are diagrams illustrating an example of a data configuration including copyright additive information.

The data structure illustrated in FIG. 21 shows an example in which the data is divided into two groups, a data group DT11 and a data group DT12. In this case, a plurality set of metadata (meta-information) can be linked with one musical piece. In one example, in a practical production spot, a plurality of sound sources is linked to a musical piece, but a plurality of right holder information items can be registered by the data structure illustrated in FIG. 21.

The item "Key: hash value" in the data group DT11 of FIG. 21 corresponds to the hash value of the sound source or the like. The "Value" in the data group DT11 corresponds to version control in which a plurality of versions is registered with one musical piece. The "Proof of record: timestamp" in the data group DT11 corresponds to the timestamp information that is the proof of the date and time. In one example, the "Proof of record: timestamp" in the data group DT11 is registered by the node 20 of the blockchain system 2 that receives the transaction corresponding to the data group DT11. The "Recording source" in the data group DT11 corresponds to the information indicating the recording source. In one example, the "Recording source" in the data group DT11 can be information indicating the subject (recording source) in which the data shown in the data group DT11 is registered. In one example, the "Recording source" in the data group DT11 can be information (identification information) indicating the node 20 that accepts the registration of data. The "Sharing destination: ID" in the data group DT11 corresponds to an IPI (IPI number), a label code, or the like. The "Owner: ID" in the data group DT11 corresponds to an IPI (IPI number), a label code, or the like. The "Notice number: ID" in the data group DT11 corresponds to information (system numbering) given by a predetermined system, such as a musical piece ID.

The "Notice number: ID" in the data group DT12 in FIG. 21 corresponds to information (system numbering) given by a predetermined system, such as a musical piece ID. The "Value" in the data group DT 12 corresponds to version control. The "Proof of record: timestamp" in the data group DT12 corresponds to the timestamp information that is the proof of the date and time. The "Recording source" in the data group DT12 corresponds to the information indicating the recording source. In one example, the "Recording source" in the data group DT12 can be information indicating the subject (recording source) in which the data shown in the data group DT12 is registered. In one example, the "Recording source" in the data group DT12 can be information (identification information) indicating the node 20 that accepts the registration of data.

The "Sharing destination: ID" in the data group DT12 corresponds to an IPI (IPI number), a label code, or the like. The "Owner: ID" in the data group DT12 corresponds to an IPI (IPI number), a label code, or the like. The "Recorder: ID" in the data group DT12 corresponds to an IPI (IPI number), a label code, or the like. In one example, the "Recorder: ID" in the data group DT12 can be information (identification information) indicating the subject (recorder) who requests the registration of the data shown in the data group DT12. In one example, the "Recorder: ID" in the data group DT12 can be information (identification information) indicating an author, a publisher, or the like. In the data group DT12, the "Identification" corresponds to the lyrics, composition, publisher, or the like. The "period" in the data group DT12 corresponds to, for example, the copyright duration. The "area" in the data group DT12 corresponds to, for example, the whole world. In one example, the "Distribution ratio" in the data group DT12 corresponds to 25%. The "Indication" in the data group DT12 corresponds to, for example, an appellation such as a name or a company name.

Further, in the example of FIG. 21, the data group DT121 in the data group DT12 is used as evidence data for consensus acquisition. Alternatively, rather than the evidence data itself, but a file path name indicating the storage location, a hash value obtained by hashing the evidence data, and so on are stored. In this way, the information including the details of the assertion of rights is hashed, stored in the blockchain, and the original data can be referred to, which facilitates the confirmation of the right information of the content, and it is possible to restrict the scope of information disclosure.

The data structure illustrated in FIG. 22 shows an example of the data group DT21 under the sampling exploitation conditions. In this case, a plurality set of metadata (meta-information) can be linked with one musical piece.

In FIG. 22, the item "Key: ID" in the data group DT11 corresponds to International Standard Musical Work Code (ISWC), International Standard Recording Code (ISRC), or the like. In one example, information regarding ISWC or ISRC is obtained from a predetermined organization or the like.

The "Value" in the data group DT 21 corresponds to version control. The "Proof of record: timestamp" in the data group DT21 corresponds to the timestamp information that is the proof of the date and time. The "Recording source" in the data group DT21 corresponds to the information indicating the recording source. In one example, the "Recording source" in the data group DT21 can be information indicating the subject (recording source) in which the data shown in the data group DT21 is registered. In one example, the "Recording source" in the data group DT21 can be information (identification information) indicating the node 20 that accepts the registration of data.

The "Recorder: ID" in the data group DT21 corresponds to an IPI (IPI number), a label code, or the like. The "Consensus: authentication record" in the data group DT21 corresponds to the information regarding the consensus. The "Permission to exploit: OK/NG" in the data group DT21 corresponds to, for example, information indicating whether or not the musical piece can be exploited. The "Prior confirmation (such as sound source or documents): No/Yes" in the data group DT21 corresponds to, for example, information related to confirmation of the sound source of the musical piece or documents. In one example, the "Distribution ratio" in the data group DT21 corresponds to 25%. The "Pre-setting (such as distribution ratio)" in the data group DT21 corresponds to information such as share such as "2 s: 5%, 15 s: 15%, 60 s: 30%".

Further, in the example of FIG. 22, the "Consensus: authentication record" and "Details of assertion of right" in the data group DT21 can be hashed and used as evidence data for obtaining consensus. In this way, the information including the details of assertion of right is hashed and stored in the blockchain so that it can be referred to, which facilitates the confirmation and distribution of the right information of the content, and it is possible to restrict the scope of the information disclosure.

2. Other Exemplary Configurations

The respective configurations described above are examples, and the information processing system 1 can be any system configuration as long as the copyright additive information is stored in the blockchain and is manageable. In one example, the information processing apparatus 100 and the management association terminal 50 can be configured integrally. In one example, the management association terminal 50 can have the function of the information processing apparatus 100, and the management association terminal 50 can be an information processing apparatus having a function of generating a transaction stored in the blockchain system 2.

Further, the information processing system 1 can have the system configuration as described below. In this case, the following parties are assumed at the system level. The supplier corresponds to the "Right holder" at the service level. In one example, there are one or more suppliers per sound source. Specifically, there is a person who creates a musical piece (sound source) and registers it with the copyright blockchain (BC), a person who modifies a sound source created by another supplier, or a person who takes over the rights of the sound source from another supplier. In one example, there is an IPI number for uniquely identifying a supplier, and there is a supplier having an IPI number.

In one example, regarding the IPI number, the disclosure is given as follows:
IPI number <http://www.cisac.org/What-We-Do/Information-Services/IPI>

The applicant applies on behalf of the application procedure to the predetermined management association (such as JASRAC). In one example, the applicant corresponds to a service-level publisher. The applicant confirms that the assertion of rights is 100%, ask the MPA, which will be described later, to sign the BC (blockchain) log, and apply to the predetermined management association as the notice of work. The MPA (such as industry management association or approver) signs the BC log (hash value+timestamp added) to apply for the sound source. With this signature, a predetermined business operator (SMP) such as a publisher applies to a predetermined management association. The PCK (sound source management system) is a system for managing sound sources. The PCK can be the predetermined front end of the copyright data clearinghouse (CDC). The PCK calculates the hash value of the sound source and checks whether the same sound source is registered. The PCK also pays out the notice ID for the hash value. The BC (BC network) can be a BC network channel for coordinating the supplier's assertion of rights (distribution ratio) for the sound source. The BC member is an organization that participates in BC Network. The BC peer/client can be a PeerNode of BC network belonging to a certain member. In one example, there can be multiple users for the client.

The following data items are included. The notice code can be converted by hash. The key can be a sound source hash value (e.g., such as 20 bytes). In addition, the notice code can be a universally unique identifier (UUID). The sound source information can use the notice code as a key. In addition, the sound source information can include a title and registration date and time as meta-information. The sound source information can include information indicating the right holder or the ratio (share) as the rights information. In one example, the sound source information can include information corresponding to the notice information NF1 as illustrated in FIG. 24.

Further, the sound source registration can be performed as follows. In one example, suppliers create a sound source. A supplier A (a representative) uploads the sound source to the PCK. The PCK calculates a hash value of the uploaded sound source. The PCK confirms that the calculated hash value is not registered with the CDC. The PCK issues the notice ID and returns it to the supplier together with the hash value. The supplier A logs in to the BC client. The supplier A sends the creation of the notice information to the BC as a block (transaction) of the BC. The notice information includes a notice ID (Key), a sound source hash value, musical piece metadata, or the assertion of rights. The BC network approves the block for creating the notice information. The supplier A notifies the predetermined business operator (SMP) and another supplier who creates the sound source of the notice ID.

Further, the notice information can be changed as follows. In one example, the metadata can be changed as follows. In one example, a supplier B, who differs from the representative who creates the notice information, logs in to the BC client. The supplier B refers to the BC notice information using the notified notice ID as a key. The supplier B changes metadata such as the assertion of rights that are missing or want to change. A block (transaction) is created and sent to the BC. The BC network approves the block of notice information change.

Further, the sound source change can be performed as follows. For example, the supplier C changes the sound source. A supplier C uploads the sound source to the PCK. The PCK calculates a hash value of the uploaded sound source. The PCK confirms that the calculated hash value is not registered with the CDC. The PCK issues the notice ID and returns it to the supplier together with the hash value. A supplier C logs in to the BC client. The supplier C refers to the notice information using the notice ID of the original sound source as a key. The supplier C copies the notice information of the original sound source and creates the notice information with a new notice ID. The supplier C sends a block to the BC to create the notice information and delete the previous notice information. The BC network approves the block for creating and deleting the notice information. The supplier C notifies the predetermined business operator (SMP) and another supplier who creates the original sound source of the notice ID.

Further, the main registration can be performed as follows. In one example, a predetermined business operator (SMP) refers to the notice information with the notice ID notified by the supplier. The predetermined business operator (SMP) confirms that the assertion of rights of the notice information is 100%. The predetermined business operator (SMP) confirms (FIX) the notice information and sends the block to the BC (BC network). The BC network approves the block of the notice information FIX. In one example, the BC network approves the block of confirmed (FIX) notice information. The predetermined business operator (SMP) acquires the BC log of the confirmed (FIX) notice information. The predetermined business operator (SMP) sends the log to the MPA and has it given a hash and a timestamp. The predetermined business operator (SMP) registers the confirmed (FIX) notice information with the predetermined system (PINE/RAPS), prints it, and creates the notice of work. The predetermined business operator (SMP) sends the notice of work to the predetermined management association. Moreover, the description above is an example, and any process can be used as long as the desired rights can be managed and registered.

Further, the processes described in the above respective embodiments, the entirety or a part of the processes described as being automatically performed can be manually performed, or the entirety or a part of the processes described as being performed manually can be performed automatically using known methods. In addition, the details or information including processing procedures, specific names, various data, or various parameters indicated in the documents mentioned above and the drawings can be optionally modified unless otherwise specified. In one example, the various types of information illustrated in each figure are not limited to the illustrated information.

Further, the components of respective apparatuses or devices illustrated are functionally conceptual and do not necessarily have to be physically illustrated or configured. In other words, the specific form in which respective apparatuses or devices are distributed or integrated is not limited to the one illustrated in the figure, and their entirety or a part is functionally or physically distributed or integrated in any units depending on various loads or usage conditions.

Further, the embodiments and modifications described above can be appropriately combined as long as the processing details between them do not contradict.

Further, the effects herein described are merely examples and are not restrictive, and other effects can be achieved.

3. Hardware Configuration

Figure 25:
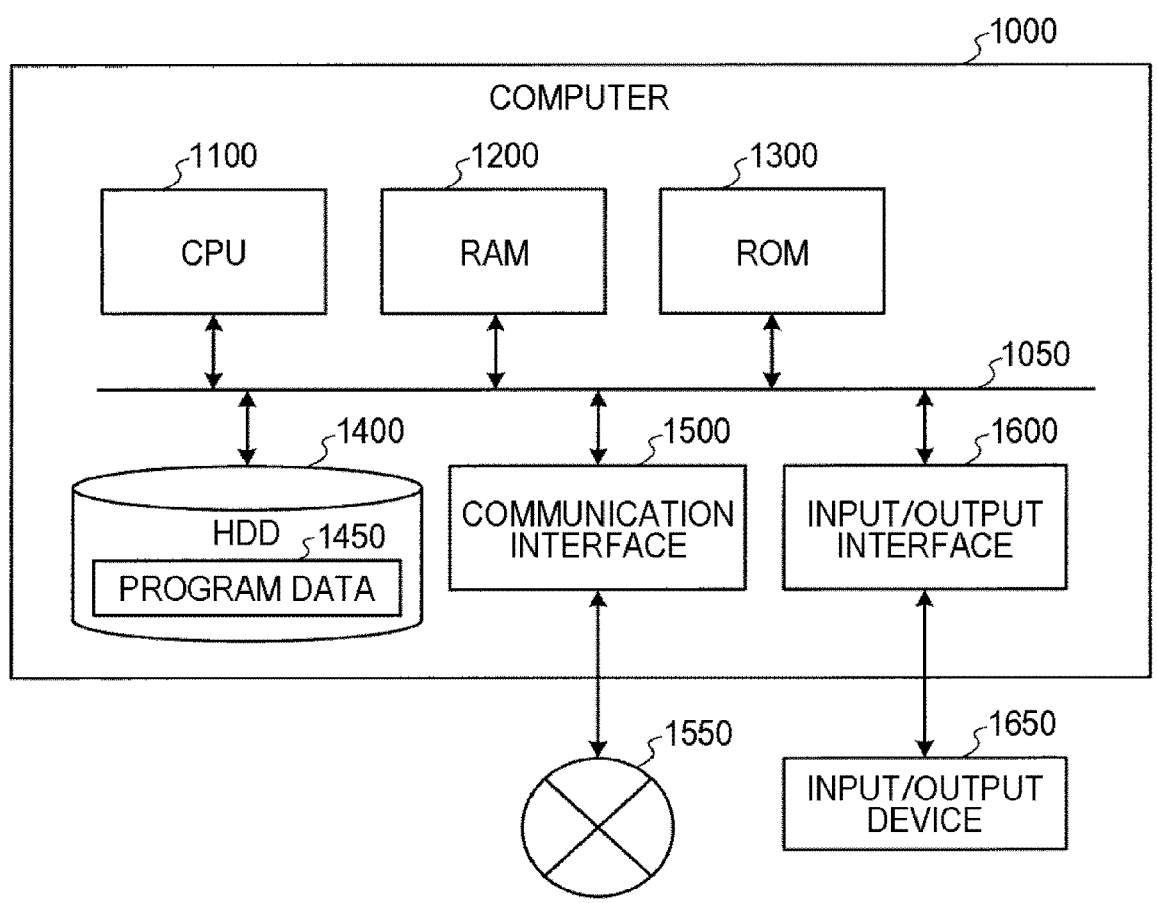
FIG. 25 is a hardware configuration diagram illustrating an example of a computer that implements the functions of an information processing apparatus or a terminal device.

The information equipment such as the information processing apparatus 100, the terminal device 10, and the management association terminal 50 according to the embodiments and modifications described above are embodied as a computer 1000 having a configuration, for example, as illustrated in FIG. 25. FIG. 25 is a hardware configuration diagram illustrating an example of the computer 1000 that implements the functions of information processing apparatuses such as the information processing apparatus 100, the terminal device 10, and the management association terminal 50. The information processing apparatus 100 according to an embodiment is now described as an example. The computer 1000 has a CPU 1100, a RAM 1200, a read-only memory (ROM) 1300, a hard disk drive (HDD) 1400, a communication interface 1500, and an input/output interface 1600. The respective components of the computer 1000 are connected via a bus 1050.

The CPU 1100 operates on the basis of the program stored in the ROM 1300 or the HDD 1400, and controls each component. In one example, the CPU 1100 loads the program stored in the ROM 1300 or the HDD 1400 into the RAM 1200 and executes processing corresponding to various programs.

The ROM 1300 stores a boot program such as a basic input output system (BIOS) executed by the CPU 1100 when the computer 1000 is started, a program that depends on the hardware of the computer 1000, or the like.

The HDD 1400 is a computer-readable recording medium that non-temporarily records a program executed by the CPU 1100, data used by such a program, or the like. Specifically, the HDD 1400 is a recording medium for recording an information processing program according to the present disclosure, which is an example of program data 1450.

The communication interface 1500 is an interface for the computer 1000 to connect to an external network 1550 (e.g., the Internet). In one example, the CPU 1100 receives data from other devices or transmits data generated by the CPU 1100 to the other devices via the communication interface 1500.

The input/output interface 1600 is an interface for connecting an input/output device 1650 with the computer 1000. In one example, the CPU 1100 receives data from an input device such as a keyboard or mouse via the input/output interface 1600. In addition, the CPU 1100 transmits data to an output device such as a display, a loudspeaker, or a printer via the input/output interface 1600. In addition, the input/output interface 1600 can function as a media interface for reading a program or the like recorded on a predetermined recording medium (media). The media is, for example, an optical recording medium such as digital versatile disc (DVD) or phase change rewritable disk (PD), a magneto-optical recording medium such as magneto-optical disk (MO), a tape medium, a magnetic recording medium, a semiconductor memory, or the like.

In one example, in the case where the computer 1000 functions as the information processing apparatus 100 according to an embodiment, the CPU 1100 of the computer 1000 implements the functions of the control unit 130 and the like by executing the information processing program loaded on the RAM 1200. In addition, the information processing program according to the present disclosure or the data in the storage unit 120 is stored in the HDD 1400. Moreover, the CPU 1100 reads the program data 1450 from the HDD 1400 and executes the program, but as another example, such a program can be acquired from other devices via the external network 1550.

Additionally, the present technology may also be configured as below.

(1)

An information processing apparatus including:

an acquisition unit configured to acquire, in a case where there is a plurality of copyright holders relating to one piece of content, consensus information indicating an agreement on a share of respective copyrights of the plurality of copyright holders; and a processing unit configured to create a transaction for recording the consensus information acquired by the acquisition unit on a blockchain.

(2)

The information processing apparatus according to (1), further including:

a storage unit configured to store content identification information used to identify content and the consensus information regarding the content in association with each other.

(3)

The information processing apparatus according to (1), in which the processing unit creates a transaction for recording copyright additive information on the blockchain, the copyright additive information including content identification information used to identify content, share information used to indicate the share of the copyright held by the copyright holders of the content, and the consensus information.

(4)

The information processing apparatus according to (1), in which the consensus information is text log information indicating the agreement on the share of the respective copyrights of the plurality of copyright holders.

(5)

The information processing apparatus according to (4), in which the consensus information is a history of an email or chatting in which the plurality of copyright holders makes the agreement on the share of the copyright.

(6)

The information processing apparatus according to (1), further including:

a transmission unit configured to transmit the transaction created by the processing unit to a node of the blockchain, the node performing recording processing on the blockchain.

(7)

The information processing apparatus according to (1), in which the processing unit executes blockchain consensus agreement processing for recording the transaction on the blockchain.

(8)

The information processing apparatus according to (7), further including:

a blockchain data storage unit configured to store data including the transaction as blockchain data upon executing the blockchain consensus agreement processing.

(9)

The information processing apparatus according to (1), in which the processing unit performs processing of converting the acquired consensus information into a hash value by a hash function and creates a transaction for recording the hash value of the consensus information on the blockchain.

(10)

The information processing apparatus according to any one of (1) to (9), further including:

a notification unit configured to give a predetermined notification to the respective right holders of the copyright in a case where a sum total of the shares held by the respective right holders of the copyright exceeds a predetermined threshold.

(11)

The information processing apparatus according to any one of (1) to (10), in which the acquisition unit acquires copyright additive information regarding an author's moral right held by an author of the content.

(12)

The information processing apparatus according to (11), in which the acquisition unit acquires the copyright additive information regarding the author's moral right that is a right to integrity held by the author.

(13)

The information processing apparatus according to (11), in which the acquisition unit acquires the copyright additive information regarding the author's moral right that is a right of attribution held by the author.

(14)

The information processing apparatus according to any one of (11) to (13), in which the acquisition unit acquires the copyright additive information regarding an intention to exercise the author's moral rights by the author.

(15)

The information processing apparatus according to (14), in which the acquisition unit acquires the copyright additive information indicating that the author has no intention to exercise the author's moral right.

(16)

The information processing apparatus according to (14), in which the acquisition unit acquires the copyright additive information indicating that the author has an intention to exercise the author's moral right.

(17)

The information processing apparatus according to any one of (11) to (16), further including:

a notification unit configured to give a predetermined notification to the author in a case where a predetermined request relating to the content is made.

(18)

The information processing apparatus according to (17), in which the notification unit gives the predetermined notification to the author in a case where the copyright additive information includes information indicating that the author permits modification of the content.

(19)

An information processing method of executing processing of:

acquiring, in a case where there is a plurality of copyright holders relating to one piece of content, consensus information indicating an agreement on a share of respective copyrights of the plurality of copyright holders; and creating a transaction for recording the acquired consensus information on a blockchain.

(20)

An information processing program for causing to execute processing of:
acquiring, in a case where there is a plurality of copyright holders relating to one piece of content, consensus information indicating an agreement on a share of respective copyrights of the plurality of copyright holders; and
creating a transaction for recording the acquired consensus information on a blockchain.

REFERENCE SIGNS LIST

1 Information processing system
100 Information processing apparatus
110 Communication unit
120 Storage unit
121 Right holder information storage unit
122 Content information storage unit
123 Consensus information storage unit
124 Function information storage unit
130 Control unit
131 Acquisition unit
132 Determination unit
133 Processing unit
134 Notification unit
135 Reception unit
136 Transmission unit
10 Terminal device
11 Communication unit
12 Input unit
13 Output unit
14 Storage unit
15 Control unit
151 Reception unit
152 Display control unit
153 Generation unit
154 Transmission unit
16 Display unit

The invention claimed is:

1. An information processing apparatus, comprising:
control circuitry configured to
acquire, when there is a plurality of copyright holders relating to one piece of content, copyright agreement information, which is electronic information separate from the one piece of content and indicating that an agreement on sharing respective copyrights of the plurality of copyright holders regarding the one piece of content has been reached;
create a transaction for recording the acquired copyright agreement information on a blockchain system;
transmit the created transaction to the blockchain system for registration on the blockchain system,
wherein the control circuitry is further configured to create the transaction for recording copyright additive information on the blockchain system, the copyright additive information including content identification information identifying the one piece of content, share information indicating a respective agreed-upon percentage share of the copyright held by each of the plurality of copyright holders of the one piece of content, and the acquired copyright agreement information; and
give a predetermined notification to the respective right holders of the copyright when a sum total of shares held by the respective right holders of the copyright exceeds a predetermined threshold.

2. The information processing apparatus according to claim 1, wherein the copyright agreement information is text log information indicating the agreement on the sharing of the respective copyrights of the plurality of copyright holders.

3. The information processing apparatus according to claim 2, wherein the copyright agreement information is a history of an email or chatting in which the plurality of copyright holders makes the agreement on the sharing of the respective copyrights.

4. The information processing apparatus according to claim 1, wherein the control circuitry is further configured to transmit the transaction to a node of the blockchain system, the node performing recording processing on the blockchain system.

5. The information processing apparatus according to claim 1, wherein the control circuitry is further configured to execute blockchain consensus agreement processing for recording the transaction on the blockchain system.

6. The information processing apparatus according to claim 5, further comprising:
a blockchain data memory to store data including the transaction as blockchain data upon executing the blockchain consensus agreement processing.

7. The information processing apparatus according to claim 1, wherein the control circuitry is further configured to perform processing of converting the acquired copyright agreement information into a hash value by a hash function, and create the transaction for recording the hash value of the copyright agreement information on the blockchain system.

8. The information processing apparatus according to claim 1, wherein the control circuitry is further configured to acquire the copyright additive information, which includes information regarding an author's moral right held by an author of the one piece of content.

9. The information processing apparatus according to claim 8, wherein the control circuitry is further configured to acquire the copyright additive information regarding the author's moral right, which is a right to integrity held by the author.

10. The information processing apparatus according to claim 8, wherein the control circuitry is further configured to acquire the copyright additive information regarding the author's moral right, which is a right of attribution held by the author.

11. The information processing apparatus according to claim 8, wherein the control circuitry is further configured to acquire the copyright additive information regarding an intention to exercise the author's moral rights by the author.

12. The information processing apparatus according to claim 11, wherein the control circuitry is further configured to acquire the copyright additive information indicating that the author has no intention to exercise the author's moral right.

13. The information processing apparatus according to claim 11, wherein the control circuitry is further configured to acquire the copyright additive information indicating that the author has an intention to exercise the author's moral right.

14. The information processing apparatus according to claim 8, wherein the control circuitry is further configured to give a predetermined notification to the author when a predetermined request relating to the one piece of content is made.

15. The information processing apparatus according to claim 14, wherein the control circuitry is further configured to give the predetermined notification to the author when the copyright additive information includes information indicating that the author permits modification of the one piece of content.

16. An information processing method, comprising:
acquiring, when there is a plurality of copyright holders relating to one piece of content copyright agreement information, which is electronic information separate from the one piece of content and indicating that an agreement on sharing respective copyrights of the plurality of copyright holders regarding the one piece of content has been reached;
creating a transaction for recording the acquired copyright agreement information on a blockchain system;
transmitting the created transaction to the blockchain system for registration on the blockchain system,
wherein the method further comprises creating the transaction for recording copyright additive information on the blockchain system, the copyright additive information including content identification information identifying the one piece of content, share information indicating a respective agreed-upon percentage share of the copyright held by each of the plurality of copyright holders of the one piece of content, and the acquired copyright agreement information; and
giving a predetermined notification to the respective right holders of the copyright when a sum total of shares held by the respective right holders of the copyright exceeds a predetermined threshold.

17. A non-transitory computer-readable medium storing an information processing program that, when executed by processing circuitry, causes the processing circuitry to execute a method comprising:
acquiring, when there is a plurality of copyright holders relating to one piece of content, copyright agreement information, which is electronic information separate from the one piece of content indicating that an agreement on sharing respective copyrights of the plurality of copyright holders regarding the one piece of content has been reached;
creating a transaction for recording the acquired copyright agreement information on a blockchain system;
transmitting the created transaction to the blockchain system for registration on the blockchain system,
wherein the method further comprises creating the transaction for recording copyright additive information on the blockchain system, the copyright additive information including content identification information identifying the one piece of content, share information indicating a respective agreed-upon percentage share of the copyright held by each of the plurality of copyright holders of the one piece of content, and the acquired copyright agreement information; and
giving a predetermined notification to the respective right holders of the copyright when a sum total of shares held by the respective right holders of the copyright exceeds a predetermined threshold.

* * * * *